United States Patent
Bomgaars et al.

(10) Patent No.: US 11,021,275 B2
(45) Date of Patent: Jun. 1, 2021

(54) METHOD AND MACHINE FOR PRODUCING STERILE SOLUTION PRODUCT BAGS

(71) Applicants: BAXTER INTERNATIONAL INC., Deerfield, IL (US); BAXTER HEALTHCARE SA, Glattpark (CH)

(72) Inventors: Grant Anthony Bomgaars, Kildeer, IL (US); Joseph Vincent Ranalletta, Englewood, CO (US); Yuanpang Samuel Ding, Long Grove, IL (US); Ying-Cheng Lo, Long Grove, IL (US); Mark Edward Pasmore, Grayslake, IL (US); Michael Joseph Sadowski, Ringwood, IL (US); Anastasios Hristakos, Evanston, IL (US); Thomas Edward Dudar, Palatine, IL (US); Bernd Krause, Rangendingen (DE)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 0 days.

(21) Appl. No.: 16/069,997

(22) PCT Filed: Jan. 20, 2017

(86) PCT No.: PCT/US2017/014264
§ 371 (c)(1),
(2) Date: Jul. 13, 2018

(87) PCT Pub. No.: WO2017/127632
PCT Pub. Date: Jul. 27, 2017

(65) Prior Publication Data
US 2019/0002136 A1    Jan. 3, 2019

Related U.S. Application Data

(60) Provisional application No. 62/281,825, filed on Jan. 22, 2016.

(51) Int. Cl.
*B65B 3/00* (2006.01)
*B65B 43/60* (2006.01)
(Continued)

(52) U.S. Cl.
CPC .............. *B65B 3/003* (2013.01); *B01D 65/10* (2013.01); *B65B 3/28* (2013.01); *B65B 31/024* (2013.01);
(Continued)

(58) Field of Classification Search
CPC ......... B65B 3/003; B65B 3/28; B65B 31/024; B65B 43/60; B65B 51/30; B65B 57/00; B01D 65/10; B01D 63/08
(Continued)

(56) References Cited

U.S. PATENT DOCUMENTS 3,233,384 A    2/1966    Barton et al.
3,902,068 A    8/1975    Wood
(Continued)

FOREIGN PATENT DOCUMENTS

CN    2498602 Y    7/2002
CN    101816846 A    9/2010
(Continued)

OTHER PUBLICATIONS

International Search Report and Written Opinion for International Application No. PCT/US2017/014264, dated May 15, 2017.
(Continued)

*Primary Examiner* — Sameh Tawfik
(74) *Attorney, Agent, or Firm* — Marshall, Gerstein & Borun LLP

(57) ABSTRACT

A method of providing filled product bags of sterile and particulate-free fluid includes securing a product bag to one of a plurality of movable cradles, wherein the product bag has a bladder, a stem fluidly connected to an opening of the
(Continued)

bladder, and a filter disposed in-line with the stem. After securing the bag, an inlet of the stem is connected to an outlet of a nozzle assembly and at least partially filling the product bag with a fluid through a nozzle of the nozzle assembly to create a filled product bag, wherein filling the product bag includes passing the fluid through the filter and into the bladder. After filling, the stem of the filled product bag is sealed at a location below the filter. The stem is cut at a location above the seal and below the filter. The method including performing an integrity test on the filter, removing the filled product bag from the cradle, and depositing the filled product bag into a first bin for rejected bags if the filter fails the integrity test and a second bin for accepted bags if filter passes the integrity test.

23 Claims, 22 Drawing Sheets

(51) Int. Cl.
  *B65B 31/02* (2006.01)
  *B01D 65/10* (2006.01)
  *B65B 3/28* (2006.01)
  *B65B 51/30* (2006.01)
  *B65B 57/00* (2006.01)
  *B01D 63/08* (2006.01)

(52) U.S. Cl.
  CPC .............. *B65B 43/60* (2013.01); *B65B 51/30* (2013.01); *B65B 57/00* (2013.01); *B01D 63/08* (2013.01)

(58) Field of Classification Search
  USPC .......................................................... 53/469
  See application file for complete search history.

(56) References Cited

U.S. PATENT DOCUMENTS

| | | | |
|---|---|---|---|
| 3,938,519 | A | 2/1976 | McPhee |
| 4,036,698 | A | 7/1977 | Bush et al. |
| 4,116,646 | A | 9/1978 | Edwards |
| 4,265,760 | A | 5/1981 | Abel et al. |
| 4,353,398 | A | 10/1982 | Weiler et al. |
| 4,360,435 | A | 11/1982 | Bellamy et al. |
| 4,369,898 | A | 1/1983 | Andersson |
| 4,502,614 | A | 3/1985 | Weiler et al. |
| 4,507,114 | A | 3/1985 | Bohman et al. |
| 4,515,007 | A | 5/1985 | Herman |
| 4,521,366 | A | 6/1985 | Mason et al. |
| 4,547,289 | A | 10/1985 | Okano et al. |
| 4,610,790 | A | 9/1986 | Reti et al. |
| 4,623,516 | A | 11/1986 | Weiler et al. |
| 4,636,307 | A | 1/1987 | Inoue et al. |
| 4,636,313 | A | 1/1987 | Vaillancourt |
| 4,668,401 | A | 5/1987 | Okumura et al. |
| 4,671,762 | A | 6/1987 | Weiler et al. |
| 4,695,382 | A | 9/1987 | Cronin |
| 4,712,590 | A | 12/1987 | Gianfilippo |
| 4,730,435 | A | 3/1988 | Riddle et al. |
| 4,738,782 | A | 4/1988 | Yamauchi et al. |
| 4,779,448 | A | 10/1988 | Gogins |
| 4,807,676 | A | 2/1989 | Cerny et al. |
| 4,820,297 | A * | 4/1989 | Kaufman .................. A61J 1/10 383/38 |
| 4,842,028 | A | 6/1989 | Kaufman et al. |
| 4,872,974 | A | 10/1989 | Hirayama et al. |
| 4,881,176 | A | 11/1989 | Kononov |
| 4,915,847 | A * | 4/1990 | Dillon .................. A61M 1/3693 210/321.6 |
| 4,937,194 | A * | 6/1990 | Pattillo .................. C12M 23/14 141/10 |
| 4,943,287 | A | 7/1990 | Carmen |
| 5,064,529 | A | 11/1991 | Hirayama et al. |
| RE33,924 | E | 5/1992 | Valeri |
| 5,180,504 | A | 1/1993 | Johnson et al. |
| 5,209,044 | A * | 5/1993 | D'Addario ............... B65B 3/04 53/272 |
| 5,221,474 | A | 6/1993 | Yokono et al. |
| 5,249,409 | A * | 10/1993 | Jensen .................... B65B 5/045 53/253 |
| 5,275,724 | A | 1/1994 | Bucchianeri et al. |
| 5,310,094 | A | 5/1994 | Martinez et al. |
| 5,353,630 | A | 10/1994 | Soda et al. |
| 5,368,586 | A | 11/1994 | Van Der Heiden et al. |
| 5,417,101 | A | 5/1995 | Weich |
| 5,476,592 | A | 12/1995 | Simard |
| 5,480,554 | A | 1/1996 | Degen et al. |
| 5,488,811 | A | 2/1996 | Wang et al. |
| 5,490,848 | A | 2/1996 | Finley et al. |
| 5,493,845 | A | 2/1996 | Adolf et al. |
| 5,507,959 | A | 4/1996 | Glick |
| 5,538,638 | A | 7/1996 | Hedman |
| 5,563,334 | A | 10/1996 | Bracht et al. |
| 5,584,997 | A | 12/1996 | Yagihashi et al. |
| 5,594,161 | A | 1/1997 | Randhahn et al. |
| 5,616,828 | A | 4/1997 | Kuczenski |
| 5,674,404 | A | 10/1997 | Kenley et al. |
| 5,733,619 | A | 3/1998 | Patel et al. |
| 5,788,862 | A | 8/1998 | Degen et al. |
| 5,808,181 | A | 9/1998 | Wamsiedler et al. |
| 5,881,535 | A | 3/1999 | Gliniecki et al. |
| 5,911,886 | A * | 6/1999 | Delmas .................. B01D 35/30 210/433.1 |
| 6,059,968 | A * | 5/2000 | Wolf, Jr. .............. A61M 1/0209 210/252 |
| 6,149,997 | A | 11/2000 | Patel et al. |
| 6,228,271 | B1 | 5/2001 | Cote |
| 6,245,228 | B1 | 6/2001 | Kelada |
| 6,324,898 | B1 | 12/2001 | Cote et al. |
| 6,358,420 | B2 | 3/2002 | Blickhan et al. |
| 6,451,201 | B1 | 9/2002 | Cadera et al. |
| 6,465,068 | B1 | 10/2002 | Patel et al. |
| 6,495,039 | B1 | 12/2002 | Lee et al. |
| 6,504,606 | B2 | 1/2003 | Yagita |
| 6,660,171 | B2 | 12/2003 | Zuk, Jr. |
| 6,666,970 | B1 | 12/2003 | Jornitz et al. |
| 6,904,370 | B1 | 6/2005 | Levinson et al. |
| 6,983,504 | B2 | 1/2006 | Grummert et al. |
| 7,048,775 | B2 | 5/2006 | Jornitz et al. |
| 7,117,901 | B2 | 10/2006 | Martinell Gisper-Sauch et al. |
| 7,166,217 | B2 | 1/2007 | Holmes et al. |
| 7,281,409 | B2 | 10/2007 | Baumfalk et al. |
| 7,354,758 | B2 | 4/2008 | Guenec et al. |
| 7,396,451 | B2 | 7/2008 | Holmes et al. |
| 7,413,665 | B2 | 8/2008 | Holmes et al. |
| 7,444,795 | B2 * | 11/2008 | Yasuhira ............... B65B 43/465 53/133.2 |
| 7,544,300 | B2 * | 6/2009 | Brugger ............. A61M 1/1656 210/645 |
| 7,592,178 | B2 | 9/2009 | Ding et al. |
| 7,594,425 | B2 | 9/2009 | Lewnard et al. |
| 7,727,219 | B2 * | 6/2010 | Lampeter ................. A01N 1/02 600/573 |
| 7,749,393 | B2 | 7/2010 | Brugger et al. |
| 7,770,434 | B2 * | 8/2010 | Brussermann ............ A61L 2/28 73/38 |
| 7,972,515 | B1 | 7/2011 | Mangum et al. |
| 8,003,768 | B1 | 8/2011 | Gordon |
| 8,225,824 | B2 * | 7/2012 | Eliuk ...................... B65B 3/003 141/192 |
| 8,271,139 | B2 * | 9/2012 | Bellafiore ............ G05D 11/139 700/265 |
| 8,272,251 | B2 | 9/2012 | Jons et al. |
| 8,361,320 | B2 | 1/2013 | Zuk, Jr. |
| 8,366,855 | B2 * | 2/2013 | Murray .................... B65B 3/04 156/249 |
| 8,499,919 | B2 * | 8/2013 | Giribona ................ B65B 3/003 198/346.1 |
| 8,865,064 | B2 | 10/2014 | Meier et al. |

(56) References Cited

U.S. PATENT DOCUMENTS

| | | | |
|---|---|---|---|
| 9,072,996 | B2 | 7/2015 | Jornitz et al. |
| 9,095,801 | B2 | 8/2015 | Stering |
| 2002/0117232 | A1 | 8/2002 | Gisper-Sauch et al. |
| 2002/0162778 | A1* | 11/2002 | Peabody .............. A61L 2/022 210/85 |
| 2003/0174306 | A1* | 9/2003 | Grant .................... G01N 1/38 356/36 |
| 2003/0230521 | A1 | 12/2003 | Schick |
| 2003/0234211 | A1 | 12/2003 | Seiler et al. |
| 2004/0007540 | A1 | 1/2004 | Verpoort et al. |
| 2004/0022696 | A1 | 2/2004 | Zigler et al. |
| 2004/0031744 | A1 | 2/2004 | Nakashima |
| 2004/0147865 | A1 | 7/2004 | Cianci et al. |
| 2004/0155066 | A1 | 8/2004 | Schick |
| 2004/0226898 | A1 | 11/2004 | Halstead et al. |
| 2004/0237654 | A1 | 12/2004 | Savall et al. |
| 2005/0209547 | A1 | 9/2005 | Burbank et al. |
| 2005/0279419 | A1* | 12/2005 | Tribble ................. G09F 3/02 141/27 |
| 2006/0048486 | A1 | 3/2006 | Laing et al. |
| 2006/0054557 | A1 | 3/2006 | Hori et al. |
| 2006/0124515 | A1 | 6/2006 | Rajagopalan et al. |
| 2007/0079649 | A1 | 4/2007 | Nauseda et al. |
| 2007/0119121 | A1* | 5/2007 | Woods ................. B65B 3/003 53/268 |
| 2007/0175816 | A1 | 8/2007 | Verpoort et al. |
| 2007/0251299 | A1 | 11/2007 | Brussermann et al. |
| 2008/0051937 | A1 | 2/2008 | Khan et al. |
| 2008/0087613 | A1 | 4/2008 | Hudock et al. |
| 2008/0105618 | A1 | 5/2008 | Beckius et al. |
| 2009/0173685 | A1 | 7/2009 | Imai et al. |
| 2009/0299651 | A1 | 12/2009 | Sadar |
| 2010/0004588 | A1 | 1/2010 | Yeh et al. |
| 2010/0004602 | A1* | 1/2010 | Nord .................. A61M 5/1626 604/198 |
| 2010/0004619 | A1* | 1/2010 | Rondeau ............. A61J 1/1475 604/407 |
| 2011/0049026 | A1 | 3/2011 | Ryu et al. |
| 2011/0067485 | A1 | 3/2011 | Grant et al. |
| 2011/0094310 | A1 | 4/2011 | DiLeo et al. |
| 2011/0094619 | A1 | 4/2011 | Steel et al. |
| 2012/0024156 | A1 | 2/2012 | Yoshida et al. |
| 2012/0080375 | A1 | 4/2012 | Scheu et al. |
| 2012/0222774 | A1 | 9/2012 | Husnu et al. |
| 2012/0282143 | A1 | 11/2012 | Marquis et al. |
| 2012/0297862 | A1 | 11/2012 | Mayr et al. |
| 2013/0055794 | A1 | 3/2013 | Armour |
| 2013/0130973 | A1 | 5/2013 | Wahren et al. |
| 2013/0233810 | A1 | 9/2013 | Zuk, Jr. |
| 2013/0240436 | A1 | 9/2013 | Johnson et al. |
| 2014/0012185 | A1 | 1/2014 | Ishizuka et al. |
| 2014/0033798 | A1 | 2/2014 | Peeler et al. |
| 2014/0083170 | A1 | 3/2014 | Pavlik |
| 2014/0238110 | A1 | 8/2014 | Williams |
| 2015/0033828 | A1 | 2/2015 | Li et al. |
| 2015/0265958 | A1* | 9/2015 | Brown ............... B01D 46/0005 95/287 |
| 2015/0283479 | A1 | 10/2015 | Perreault et al. |
| 2015/0284173 | A1 | 10/2015 | Defemme et al. |
| 2015/0298995 | A1 | 10/2015 | Johann et al. |
| 2015/0307606 | A1 | 10/2015 | Basarkar et al. |
| 2016/0201019 | A1 | 7/2016 | Stokes et al. |

FOREIGN PATENT DOCUMENTS

| | | |
|---|---|---|
| CN | 201643862 U | 11/2010 |
| CN | 201732014 U | 2/2011 |
| CN | 102109364 A | 6/2011 |
| CN | 201939752 U | 8/2011 |
| CN | 102313691 A | 1/2012 |
| CN | 102430340 A | 5/2012 |
| CN | 102435224 A | 5/2012 |
| CN | 102947186 A | 2/2013 |
| CN | 103393542 A | 11/2013 |
| CN | 103476381 A | 12/2013 |
| CN | 203337507 U | 12/2013 |
| CN | 203493987 U | 3/2014 |
| CN | 104048839 A | 9/2014 |
| CN | 204797991 U | 11/2015 |
| CN | 105209342 A | 12/2015 |
| CN | 204910247 U | 12/2015 |
| CN | 204988705 U | 1/2016 |
| CN | 205262990 U | 5/2016 |
| CO | 15004569 | 7/2015 |
| DE | 3238649 A1 | 4/1984 |
| DE | 3333283 A1 | 4/1985 |
| DE | 4339589 C1 | 12/1994 |
| DE | 29618092 U1 | 12/1996 |
| DE | 20212749 U1 | 10/2002 |
| DE | 10151270 A1 | 5/2003 |
| DE | 202010017082 U1 | 5/2011 |
| DE | 10165044 B4 | 1/2013 |
| DE | 102011111050 A1 | 2/2013 |
| DE | 102012216772 A1 | 3/2014 |
| DE | 202015101765 U1 | 4/2015 |
| DE | 102014113638 A1 | 3/2016 |
| EP | 0116362 A2 | 8/1984 |
| EP | 0314822 A1 | 5/1989 |
| EP | 0476194 A1 | 3/1992 |
| EP | 0582822 A1 | 2/1994 |
| EP | 0667954 A1 | 8/1995 |
| EP | 0624359 B1 | 5/1997 |
| EP | 0790051 A2 | 8/1997 |
| EP | 0545000 B1 | 10/1997 |
| EP | 0820343 A1 | 1/1998 |
| EP | 1579838 A1 | 9/2005 |
| EP | 1775002 A1 | 4/2007 |
| EP | 1882486 A1 | 1/2008 |
| EP | 1935470 A1 | 6/2008 |
| EP | 2012906 A2 | 1/2009 |
| EP | 2059443 A2 | 5/2009 |
| EP | 2260918 A2 | 12/2010 |
| EP | 2331078 A1 | 6/2011 |
| EP | 2502610 A1 | 9/2012 |
| EP | 2658502 A2 | 11/2013 |
| EP | 2684551 | 1/2014 |
| EP | 2767583 A1 | 8/2014 |
| EP | 2840379 A1 | 2/2015 |
| FR | 2909904 A1 | 6/2008 |
| GB | 2153247 A | 8/1985 |
| GB | 2362841 A | 12/2001 |
| GB | 2365511 A | 2/2002 |
| JP | S5840202 U | 3/1983 |
| JP | S6058530 A | 4/1985 |
| JP | 6091203 U1 | 6/1985 |
| JP | S60197287 A | 10/1985 |
| JP | S621410 A | 1/1987 |
| JP | H01139108 A | 5/1989 |
| JP | 02290228 | 11/1990 |
| JP | H038420 A | 1/1991 |
| JP | H03110445 A | 5/1991 |
| JP | H04142445 A | 5/1992 |
| JP | H04348252 A | 12/1992 |
| JP | H0523551 A | 2/1993 |
| JP | H0643089 A | 2/1994 |
| JP | 6-34636 | 5/1994 |
| JP | H10225628 A | 8/1998 |
| JP | 2009-519440 A | 5/2009 |
| JP | 5389885 B2 | 1/2014 |
| JP | 2014128780 A | 7/2014 |
| JP | 2014521405 A | 8/2014 |
| JP | 2015-74457 A | 4/2015 |
| RU | 2389513 C2 | 5/2010 |
| SU | 247843 A1 | 7/1969 |
| WO | WO-88/03829 A1 | 6/1988 |
| WO | WO-96/14913 A1 | 5/1996 |
| WO | WO-2004/009201 A2 | 1/2004 |
| WO | WO-2004/096319 A1 | 11/2004 |
| WO | WO-2005/077499 A1 | 8/2005 |
| WO | WO-2008/039278 A1 | 4/2008 |
| WO | WO-2009/006850 A1 | 1/2009 |
| WO | WO-2010/065810 A2 | 6/2010 |
| WO | WO-2011/154072 A1 | 12/2011 |

(56) References Cited

FOREIGN PATENT DOCUMENTS

| WO | WO-2012/103124 A2 | 8/2012 |
| WO | WO-2013/009765 A2 | 1/2013 |
| WO | WO-2014/008400 A2 | 1/2014 |
| WO | WO-2014/105946 A1 | 7/2014 |
| WO | WO-2014147159 A1 | 9/2014 |
| WO | WO-2015/023468 A1 | 2/2015 |
| WO | WO-2015/082855 A1 | 6/2015 |
| WO | WO-2013/186631 | 7/2015 |
| WO | WO-2016/030013 A1 | 3/2016 |
| WO | WO-2016/109230 A2 | 7/2016 |

OTHER PUBLICATIONS

Chinese Patent Application No. 201780007336.2, Notification of First Office Action, dated Nov. 19, 2018.
Japanese Patent Application No. 2018-535037, Notice of Reasons for Rejection, dated Dec. 10, 2018.
Korean Patent Application No. 10-2018-7020665, Notice of Preliminary Rejection, dated Dec. 7, 2018.
Russian Patent Application No. 2018130311, Decision to Grant and Search Report, dated Feb. 19, 2019.
German Patent Application No. 112017000474.8, Office Action, dated May 14, 2019.
European Patent Application No. 17705206.5, Communication Pursuant to Article 94(3) EPC, dated May 31, 2019.
Malaysia Patent Application No. PI 2018001312, Exam and Search Report dated Jul. 8, 2019.
Great Britain Patent Application No. GB1911992.4, Search Report, dated Dec. 24, 2019.
Canadian Patent Application No. 3011514, Office Action, dated Nov. 20, 2019.
Colombia Patent Application No. NC2018/0006820, Office Action, dated Sep. 6, 2019.
Australian Patent Application No. 2019236592, Examination Report No. 1, dated Nov. 20, 2020.
Canadian Patent Application No. 3011514, Office Action, dated Apr. 23, 2020.
Colombian Patent Application No. NC2018/0006820, Second Office Action, dated May 27, 2020.
European Patent Application No. 19213877.4, Extended European Search Report, dated Feb. 26, 2020.
European Patent Application No. 19213877.4, Communication Pursuant to Article 94(3) EPC, dated Mar. 16, 2021.

* cited by examiner

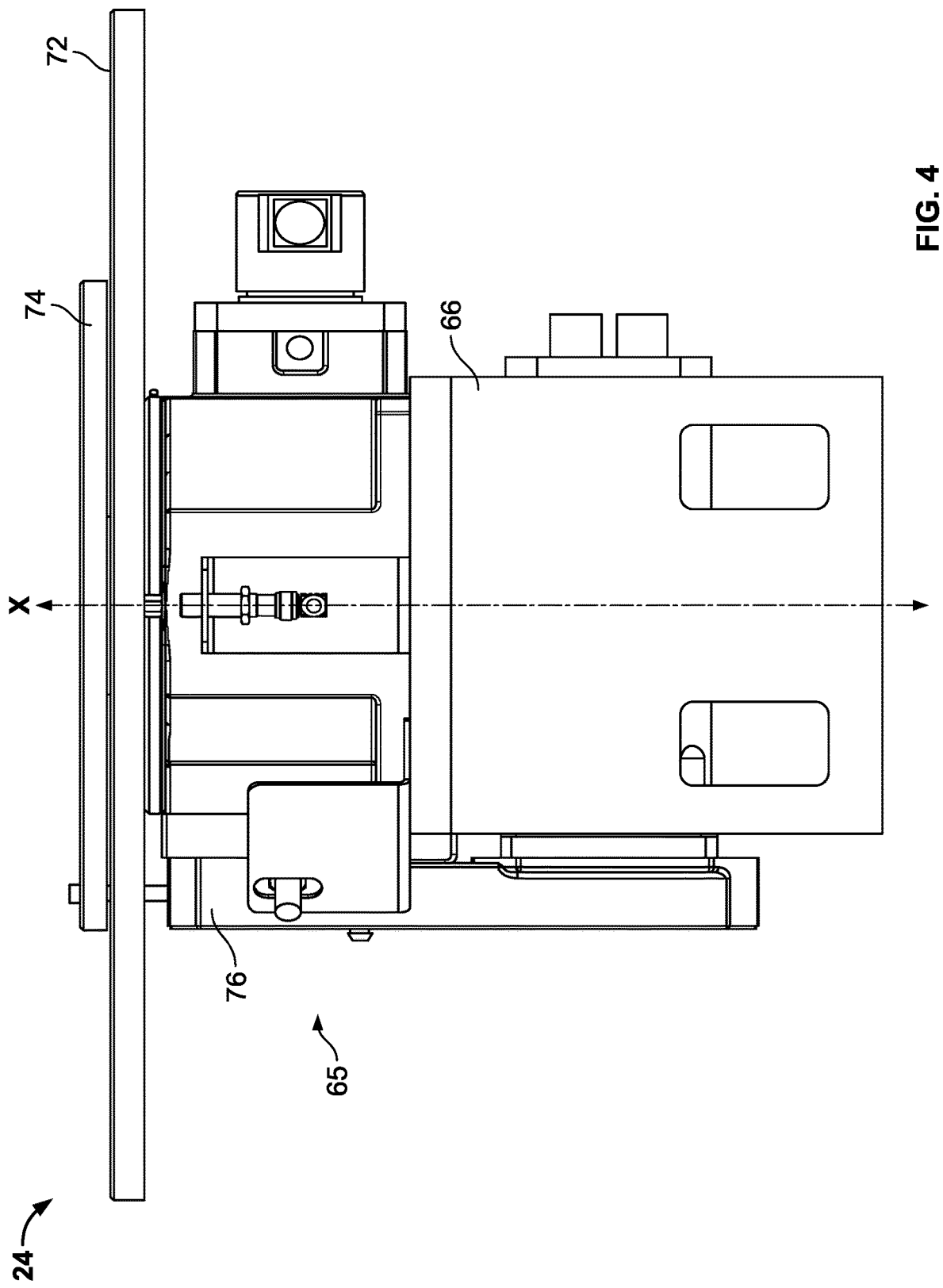

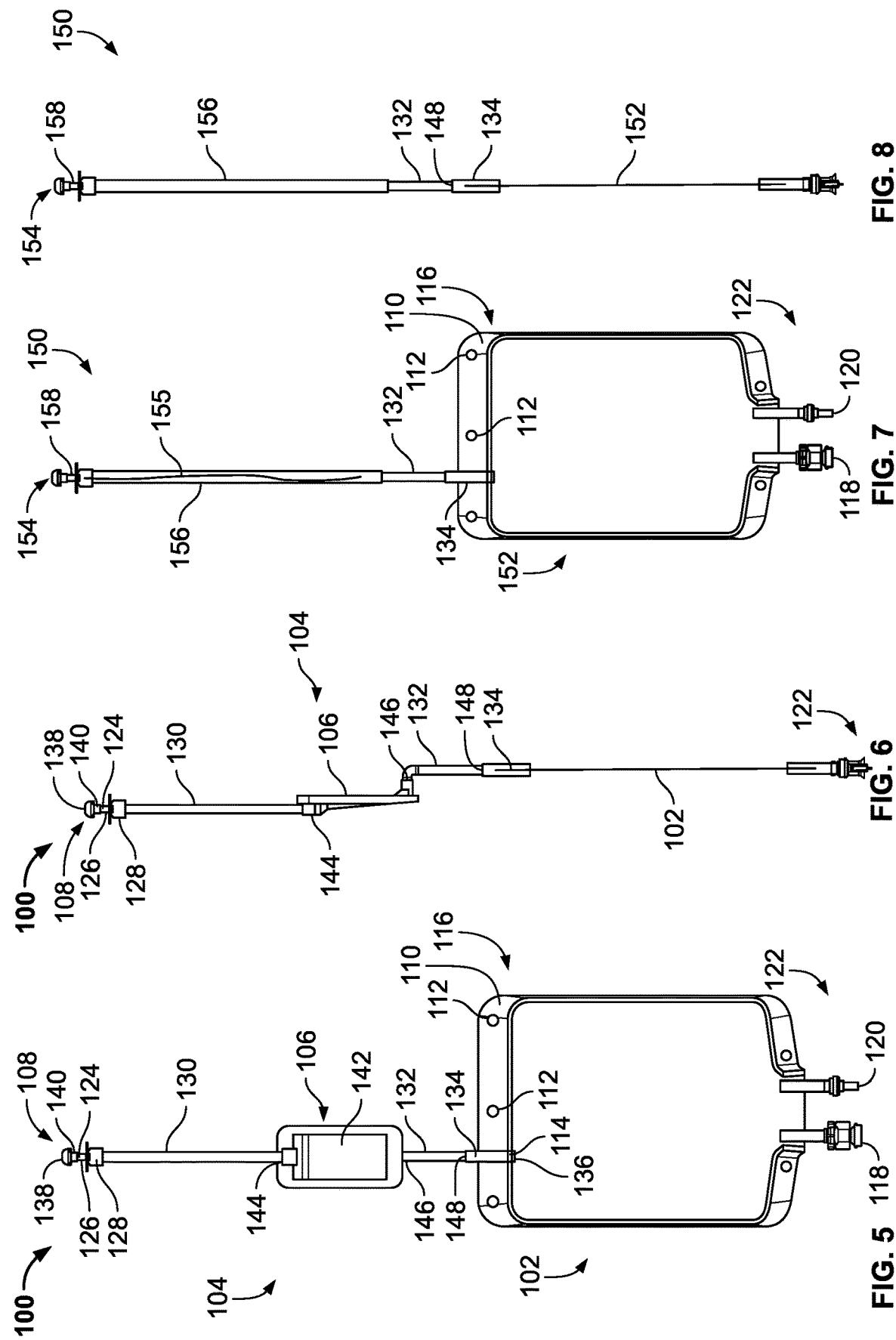

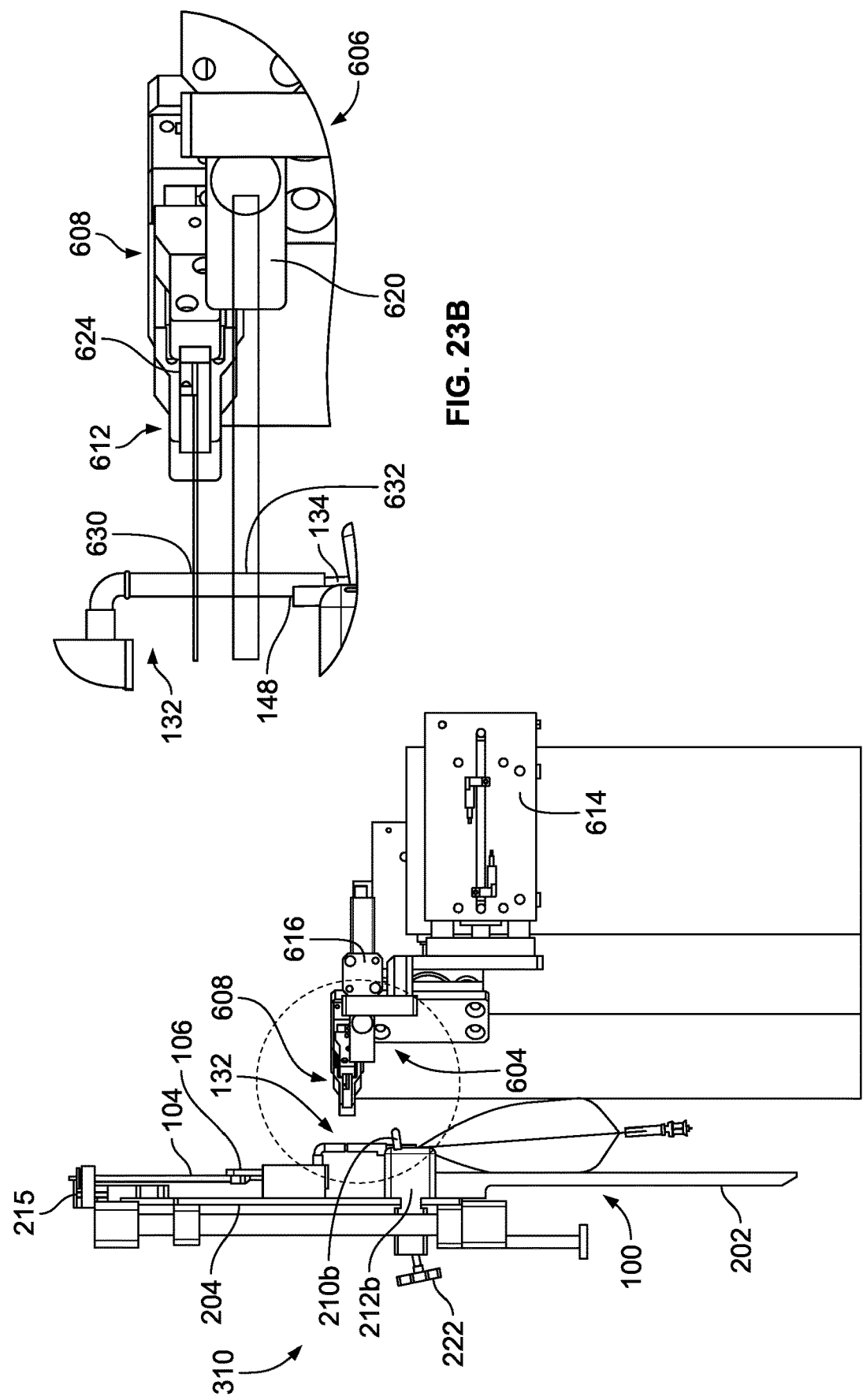

METHOD AND MACHINE FOR PRODUCING STERILE SOLUTION PRODUCT BAGS

CROSS-REFERENCE TO RELATED APPLICATION

This is the US national phase of International Patent Application No. PCT/US2017/014264, filed Jan. 20, 2017, which claims the priority benefit of U.S. Provisional Patent Application No. 62/281,825, filed Jan. 22, 2016, the entire contents of each of which are incorporated by reference herein.

FIELD OF THE DISCLOSURE

The present disclosure generally relates to a method and machine for providing filled bags of sterile solution and, more particularly, to a small scale solution manufacturing machine to implement the method of providing sterile solution product container or bags.

BACKGROUND

Conventional methods for manufacturing bags of sterile solution include filling bags in a clean environment with a solution, sealing the filled bag of solution, and then sterilizing the fluid and bags in a sterilizing autoclave. This can be referred to as terminal sterilization. Another conventional method is to sterile filter a solution and to fill and seal sterile bags in an extremely high-quality environment designed and controlled to prevent contamination of the solution during the filling process and to seal the filled bag. This can be referred to as an aseptic filling process.

Terminal sterilization generally requires autoclaves to produce the sterilizing heat and steam needed. These autoclaves generally are not economical unless they can produce large batches of terminally sterilized bags. Thus the capital expenditure needed and space requirements lead to centralized manufacturing facilities that produce the filled bags and then ship them some distance to their destination for use. Also, the application of terminal sterilization processes may degrade the solution formulation thereby leading to incompatible or unstable formulations. Moreover, terminal sterilization does not eliminate non-viable contamination.

The aseptic manufacturing process must occur in a sterile working environments, and require expensive equipment, stringent procedures and extensive monitoring to ensure that solution product bags meet certain environmental and manufacturing regulatory standards. Sterilizing a working environment, by itself, can be costly and time consuming. Additional precautions apply for technicians involved in the filling process to ensure the production of safe and sterile products. Even with these safeguards, unless it can be verified that the solution entering the bag is sterile, there is a risk that contaminants may have inadvertently been introduced into the solution during filling/sealing, and once introduced, unless the solution later passes through a viable sterilizing filter, the contaminants will remain in the solution. Again due to these requirements, sterile solution product bags are often produced in centralized locations and shipped some distance to their destination for use.

Considering the costs associated with manufacturing sterile solution product bags, most health centers and clinics outsource their supply of sterile bags to manufacturing companies. To maintain the sterility of the shipment of bags, the sterile product bags must be carefully packaged and shipped to ensure safe delivery. As such, buying sterile product bags from a remote location may be very expensive and may increase the risk of contamination.

SUMMARY

A small scale solution manufacturing machine and method for filling product bags with sterile solution in accordance with the teachings described herein may address the cost limitations of terminal sterilization or aseptic filling, remove non-viable contaminants, eliminate post filtration contamination risks and provide quality assurance on a one-to-one basis. In other words, each product bag filled and sealed by the method described herein undergoes individual testing to ensure that the solution contained therein has undergone a terminal sterilization filtration thereby meeting regulatory and sterile standards. The construction, small footprint of the machine, and ability to produce small lots of bags in a continuous flow allows the machine to be located and production method employed at or within a close distance of the user.

In accordance with a first exemplary aspect, a method of providing a plurality of filled product bags of sterile fluid includes providing a plurality of products bags, wherein each product bag has a bladder, a stem fluidly connected to an opening of the bladder, and a filter of a desired construction disposed in-line with the stem. The method includes creating a plurality of filled product bags by performing the following on each product bag: at least partially filling the product bag with a sterile fluid to create a filled product bag and sealing the filled product bag. The method includes performing an integrity test on the filter and correlating an integrity of the contents of a filled product bag to an integrity of the filter based on an outcome of the integrity test.

In accordance with a second exemplary aspect, a method of providing filled product bags of sterile fluid using a machine includes loading a product bag onto a loaded cradle of a plurality of movable cradles carried by a carousel, the loaded cradle occupying a loading position, and the product bag includes a bladder, a stem fluidly connected to an opening of the bladder, and a filter disposed in-line with the stem. Next, the method includes moving the loaded cradle and the product bag to a filling station that includes a nozzle by rotating the carousel and moving the loaded cradle from the loading position to a filling position adjacent the nozzle. The method further includes connecting an inlet of the product bag to the nozzle by moving the loaded cradle and the product bag toward the nozzle and at least partially filling the product bag with a fluid dispensed through the nozzle to create a filled product bag. Then, the method includes moving the loaded cradle and the filled product bag to a sealing and cutting station that includes a sealing device and a cutting device by rotating the carousel from the filling position to a sealing and cutting position. In the sealing and cutting position, the method includes moving the sealing device to the stem of the filled bag, sealing the stem of the filled bag with the sealing device, and moving the sealing device away from the filled bag. The method includes moving the cutting device to the stem of the filter bag, cutting the stem at a location above the seal, and moving the cutting device away from the filled bag. After sealing and cutting the stem of the bag, the method includes moving the loaded cradle and the bag to a testing station that includes a testing device by rotating the carousel from the sealing and cutting position to a testing position and performing a filter integrity test on the filter at the testing position. At the testing station, the method further includes removing the filled product bag from the cradle and receiving the filled product bag in one of a rejected bin or an accepted bin based on the results of filter integrity test.

In accordance with a third exemplary aspect, an automated machine for creating a plurality of sterile fluid-filled product bags includes a nozzle assembly, a carrier having a movable cradle for receiving at least one product bag including a bladder, a stem fluidly connected to an opening of the bladder, and a filter disposed in-line with the stem. The machine further includes a filling station including the nozzle assembly having a nozzle configured to engage an inlet of the stem and fluidly connect with the bladder. A sealing and cutting station of the machine includes a sealing device configured to seal the stem of the product bag at a location above the opening of the bladder and below the filter, and a cutting device having a blade for cutting the stem at a location above the seal and below the filter. The machine includes a testing station having a filter integrity testing apparatus which includes a filter testing device and a pressure sensor. The filter testing device is configured to engage the inlet of the stem of each sterile fluid-filled product bag to perform a filter integrity test, and the filter passing the filter integrity test correlates to an accepted bag and the filter failing the filter integrity test correlates to a rejected bag.

In further accordance with any one or more of the foregoing first, second, or third aspects, a method and/or machine may further include any one or more of the following preferred forms. In a preferred form of the method, connecting the inlet of the stem to the nozzle includes moving the cradle.

In a preferred form, the method includes connecting an inlet of the stem to an outlet of a nozzle.

In a preferred form of the method, filling the product bag includes passing the fluid through the filter and into the bladder.

In a preferred form, the method includes securing an initially empty, sterile product bag to one of a plurality of movable cradles or conveyance systems.

In a preferred form, the method includes removing the filled product bag from the cradle, and depositing the filled product bag into a first bin for rejected bags if the filter fails the integrity test and a second bin for accepted bags if filter passes the integrity test.

In a preferred form of the method, at least partially filling the product bag includes drawing the fluid from a mixing bag through a fill tube, and dispensing the fluid from the fill tube through an outlet of the nozzle of the nozzle assembly.

In a preferred form of the method, connecting the inlet of the stem to the nozzle assembly includes engaging a luer fitting of the nozzle to the inlet of the stem.

In a preferred form, the method includes removing a sterile closure cap covering the inlet of the stem using a ramp by rotating the carousel from the loading position to the filling position and passing the cradle adjacent the ramp such that the ramp engages and removes the sterile closure cap of the stem as the carousel rotates.

In a preferred form of the method, creating a filled product bag includes measuring an amount of fluid in the bladder with a load cell, and discontinuing filling the product bag when the product bag contains a predetermined amount of fluid.

In a preferred form, the method includes discontinuing filling includes removing the inlet of the stem from the nozzle.

In a preferred form of the method, performing the integrity test includes performing at least one of a bubble test, a pressure degradation test, and alternate physical test on the filter and wherein performing the integrity test may include sensing a pressure applied to the filter with a pressure sensor.

In a preferred form, the method includes moving a diverter directed to one of the first bin or the second bin based on the results of the filter integrity test and wherein performing the filter integrity test includes assessing the filter for structural flaws.

In a preferred form of the method, filling the product bag includes passing the fluid through the filter.

In a preferred form of the method, passing the fluid through the filter includes passing the fluid through a sterilizing grade filter.

In a preferred form of the method, passing the fluid through the filter includes passing the fluid through a 0.2 micron filter.

In a preferred form, the method includes correlating the results of the filter integrity test to the quality of fluid in the filled product bag.

In a preferred form, the method includes assessing results from the filter integrity test and determining the filled bag as acceptable or unacceptable.

In a preferred form of the machine, the testing station further includes a diverter configured to move between a first position and a second position, and wherein the diverter occupies the first position in response to a pass result of the filter integrity test and the diverter occupies the second position in response to a fail result of the filter integrity test.

In a preferred form of the machine, the diverter is disposed below the filled bag and configured to direct the bag into one of a first bin or a second bin.

In a preferred form of the machine, the first bin receives a rejected filled product bag from the diverter in the first position, and wherein the second bin receives an accepted filled product bag from the diverter in the second position.

In a preferred form, the machine includes a station having a ramp located between the testing station and the filling station, wherein the ramp is configured to engage a sterile closure cap of the product bag and remove the sterile closure cap as the bag and the ramp move relative to the other.

In a preferred form of the machine, the ramp is forked and includes a slot for removing the sterile closure cap.

In a preferred form of the machine, the carrier comprises a carousel rotatable about a central axis, the carrier carrying a plurality of movable cradles.

In a preferred form of the machine, a plurality of stations are disposed about a perimeter of the carousel.

In a preferred form of the machine, the carrier carries a load cell to monitor the product bag.

In a preferred form of the machine, the cradle is movable relative to each of the plurality of stations.

In a preferred form of the machine, the sealing device includes an actuator to advance a sealer toward and away from the stem.

In a preferred form of the machine, the cutting device includes an actuator to advance the blade of the cutting device toward and away from the stem.

In a preferred form, the machine includes a mixing bag for containing a fluid, the mixing bag fluidly connected to the nozzle assembly.

The machine further includes at least one sterilizing filter disposed within a fill tube, the fill tube fluidly connecting the mixing bag to the nozzle assembly.

According to a first independent aspect, a method of providing a plurality of filled product bags of sterile fluid is provided. The method includes providing a plurality of product bags, wherein each product bag has a bladder, a stem fluidly connected to an opening of the bladder, and a filter disposed in-line with the stem. The method further includes creating a plurality of filled product bags by performing the following on each product bag. The method further includes at least partially filling the product bag with a fluid to create a filled product bag, wherein filling the product bag includes passing the fluid through the filter and into the bladder. The method further includes, after filling, sealing the filled product bag. The method further includes performing an integrity test on the filter and correlating an integrity of the contents of the filled product bag to an integrity of the filter based on an outcome of the integrity test.

In a second aspect according to the previous aspect, the method further includes connecting an inlet of the stem to an outlet of a nozzle.

In a third aspect according to the previous aspects, the method further includes securing a product bag to one of a plurality of movable cradles and rotating a carousel about a central axis, the carousel carrying the plurality of movable cradles evenly disposed on a perimeter of the carousel, wherein rotating the carousel moves each of the plurality of cradles between two positions of a plurality of positions.

In a fourth aspect according to the previous aspects, connecting the inlet of the stem to the nozzle includes moving the cradle.

In a fifth aspect according to the previous aspects, at least partially filling the product bag includes drawing the fluid from a mixing bag through a fill tube, and dispensing the fluid from the fill tube through the outlet of the nozzle.

In a sixth aspect according to the previous aspects, connecting the inlet of the stem to the nozzle includes engaging a luer fitting of the nozzle to the inlet of the stem.

In a seventh aspect according to the previous aspects, the method further includes removing a sterile closure cap covering the inlet of the stem before connecting the inlet to the nozzle.

In an eighth aspect according to the previous aspects, the method further includes measuring an amount of fluid in the bladder of the filled product bag with a load cell, and discontinuing filling the product bag when the product bag contains a predetermined amount of fluid.

In a ninth aspect according to the previous aspects, discontinuing filling includes removing the inlet of the stem from the nozzle.

In a tenth aspect according to the previous aspects, the method further includes disconnecting the inlet of the stem from the nozzle when the product bag is filled to the predetermined amount.

In an eleventh aspect according to the previous aspects, performing the integrity test includes performing at least one of a bubble test and a pressure degradation test.

In a twelfth aspect according to the previous aspects, performing the integrity test includes sensing a pressure applied to the filter with a pressure sensor.

In a thirteenth aspect according to the previous aspects, the method further includes depositing the filled product bag into a first bin for rejected bags if the filter fails the integrity test and a second bin for accepted bags if filter passes the integrity test.

In a fourteenth aspect according to the previous aspects, the method further includes moving a diverter directed to one of the first bin or the second bin based on the results of the filter integrity test.

In a fifteenth aspect according to the previous aspects, performing the filter integrity test includes assessing the filter for structural flaws.

In a sixteenth aspect according to the previous aspects, passing the fluid through the filter includes passing the fluid through a sterilizing grade filter.

In a seventeenth aspect according to the previous aspects, passing the fluid through the filter includes passing the fluid through a 0.2 micron filter.

In an eighteenth aspect according to the previous aspects, the method further includes removing the filled product bag from the cradle.

In a nineteenth independent aspect, a method of providing filled product bags of sterile fluid using a machine is provided. The method includes loading a product bag onto a loaded cradle of a plurality of movable cradles carried by a carousel, the loaded cradle occupying a loading position, the product bag including a bladder, a stem fluidly connected to an opening of the bladder, and a filter disposed in-line with the stem. The method also includes moving the loaded cradle and the product bag to a filling station that includes a nozzle by rotating the carousel and moving the loaded cradle from the loading position to a filling position adjacent the nozzle. The method also includes connecting an inlet of the product bag to the nozzle by moving the loaded cradle and the product bag toward the nozzle. The method also includes at least partially filling the product bag with a fluid dispensed through the nozzle to create a filled product bag. The method also includes moving the loaded cradle and the filled product bag to a sealing and cutting station that includes a sealing device and a cutting device by rotating the carousel from the filling position to a sealing and cutting position. The method also includes moving the sealing device to the stem of the filled product bag, and sealing the stem of the filled product bag with the sealing device. And, the method further includes moving the sealing device away from the filled product bag, moving the cutting device to the stem of the filled product bag, cutting the stem at a location above the seal with the cutting device, and moving the cutting device away from the filled product bag. And, the method further includes moving the loaded cradle and the filled product bag to a testing station that includes a testing device by rotating the carousel from the sealing and cutting position to a testing position, performing a filter integrity test on the filter at the testing position, removing the filled product bag from the cradle, and receiving the filled product bag in one of a rejected bin or an accepted bin based on the results of filter integrity test.

In a twentieth aspect according to the previous aspects, the method further includes removing a sterile closure cap covering the inlet of the stem using a ramp by rotating the carousel from the loading position to the filling position and passing the loaded cradle adjacent the ramp such that the ramp engages and removes the sterile closure cap of the stem as the carousel rotates.

In a twenty-first aspect according to the previous aspects, the method further includes correlating the results of the filter integrity test to a quality of fluid in the filled product bag.

In a twenty-second aspect according to the previous aspects, filling the product bag includes passing the fluid through the filter.

In a twenty-third aspect according to the previous aspects, the method further includes assessing results from the filter integrity test and determining the filled product bag as acceptable or unacceptable.

In a twenty-fourth aspect according to the previous aspects, the method further includes rotating the carousel about a central axis, the carousel carrying the plurality of movable cradles evenly disposed on a perimeter of the carousel, wherein rotating the carousel moves each of the plurality of movable cradles between two positions of a plurality of positions.

In a twenty-fifth aspect according to the previous aspects, atleast partially filling the product bag includes drawing the fluid from a mixing tank through a fill tube, and dispensing the fluid from the fill tube through the nozzle of the nozzle assembly.

In a twenty-sixth aspect according to the previous aspects, connecting the inlet of the stem to the nozzle assembly includes engaging a luer fitting of the nozzle to the inlet of the stem.

In a twenty-seventh aspect according to the previous aspects, creating a filled product bag includes measuring an amount of fluid in the bladder with a load cell, and discontinuing filling the product bag when the product bag contains a predetermined amount of fluid.

In a twenty-eighth aspect according to the previous aspects, discontinuing filling includes removing the inlet of the stem from the nozzle.

In a twenty-ninth aspect according to the previous aspects, the method further includes disconnecting the inlet of the stem from the nozzle when the product bag is filled to the predetermined amount.

In a thirtieth aspect according to the previous aspects, performing the integrity test includes performing at least one of a bubble test and a pressure degradation test.

In a thirty-first aspect according to the previous aspects, performing the integrity test includes sensing a pressure applied to the filter with a pressure sensor.

In a thirty-second aspect according to the previous aspects, the method further includes moving a diverter directed to one of the first bin or the second bin based on the results of the filter integrity test.

In a thirty-third aspect according to the previous aspects, performing the filter integrity test includes assessing the filter for structural flaws.

In a thirty-fourth aspect according to the previous aspects, filling the product bag includes passing the fluid through the filter and into the bladder.

In a thirty-fifth aspect according to the previous aspects, passing the fluid through the filter includes passing the fluid through a sterilizing grade filter.

In a thirty-sixth aspect according to the previous aspects, passing the fluid through the filter includes passing the fluid through a 0.2 micron filter.

In a thirty-seventh aspect preferably, but not necessarily, according to the previous aspects, an automated machine for creating sterile fluid-filled product bags is provided. The machine includes a nozzle assembly, a carrier, a filling station, a sealing and cutting station, and a testing station. The carrier can have a movable cradle for receiving at least one product bag, the product bag including a bladder, a stem fluidly connected to an opening of the bladder, and a filter disposed in-line with the stem. The filling station includes the nozzle assembly, the nozzle assembly having a nozzle configured to engage an inlet of the stem and fluidly connect with the bladder. The sealing and cutting station includes a sealing device configured to seal the stem of the product bag at a location above the opening of the bladder and below the filter, and a cutting device having a blade for cutting the stem at a location above the seal and below the filter. The testing station includes a filter integrity testing apparatus. The filter integrity testing apparatus including a filter testing device and a pressure sensor. The filter testing device is configured to engage the inlet of the stem of each sterile fluid-filled product bag to perform a filter integrity test, and wherein the filter passing the filter integrity test correlates to an accepted bag and wherein the filter failing the filter integrity test correlates to a rejected bag.

In a thirty-eighth aspect according to the previous aspects, the testing station further includes a diverter configured to move between a first position and a second position, and wherein the diverter occupies the first position in response to a pass result of the filter integrity test and the diverter occupies the second position in response to a fail result of the filter integrity test.

In a thirty-ninth aspect according to the previous aspects, the diverter is disposed below the filled product bag and configured to direct the filled product bag into one of a first bin or a second bin.

In a fortieth aspect according to the previous aspects, the first bin receives a rejected filled product bag from the diverter in the first position, and wherein the second bin receives an accepted filled product bag from the diverter in the second position.

In a forty-first aspect according to the previous aspects, the machine further includes a station having a ramp located between the testing station and the filling station, wherein the ramp is configured to engage a sterile closure cap of the product bag and remove the sterile closure cap as the product bag and the ramp move relative to the other.

In a forty-second aspect according to the previous aspects, the ramp is forked and includes a slot for removing the sterile closure cap.

In a forty-third aspect according to the previous aspects, the carrier comprises a carousel rotatable about a central axis, the carousel carrying a plurality of movable cradles.

In a forty-forth aspect according to the previous aspects, a plurality of stations are disposed about a perimeter of the carousel.

In a forty-fifth aspect according to the previous aspects, the carrier carries a load cell to monitor the product bag.

In a forty-sixth aspect according to the previous aspects, the cradle is movable relative to each of the plurality of stations.

In a forty-seventh aspect according to the previous aspects, the sealing device includes an actuator to advance a sealer toward and away from the stem.

In a forty-eighth aspect according to the previous aspects, the cutting device includes an actuator to advance the blade of the cutting device toward and away from the stem.

In a forty-ninth aspect according to the previous aspects, the machine further includes a mixing bag for containing a fluid, the mixing bag fluidly connected to the nozzle assembly.

In a fiftieth aspect according to the previous aspects, the machine further includes at least one sterilizing filter disposed within a fill tube, the fill tube fluidly connecting the mixing bag to the nozzle assembly.

BRIEF DESCRIPTION OF THE DRAWINGS

FIG. 4 is a partial side view of a carousel assembly in accordance with the teachings of the present disclosure.

FIG. 5 is front view of a first exemplary product bag having a sterilizing grade flat membrane filter disposed in-line with a stem of the product bag in accordance with the teachings of the present disclosure.

FIG. 6 is a side view of the product bag of FIG. 5.

FIG. 7 is a front view of a second exemplary product bag having a sterilizing grade fiber membrane filter disposed in-line with a stem of the product bag in accordance with the teachings of the present disclosure.

FIG. 8 is a side view of the product bag of FIG. 7.

FIG. 23A is a side view of the sealing and cutting station and loaded cradle assembly of FIG. 22.

FIG. 23B is a detailed view taken from circle D of FIG. 23A.

DETAILED DESCRIPTION

Figure 1:
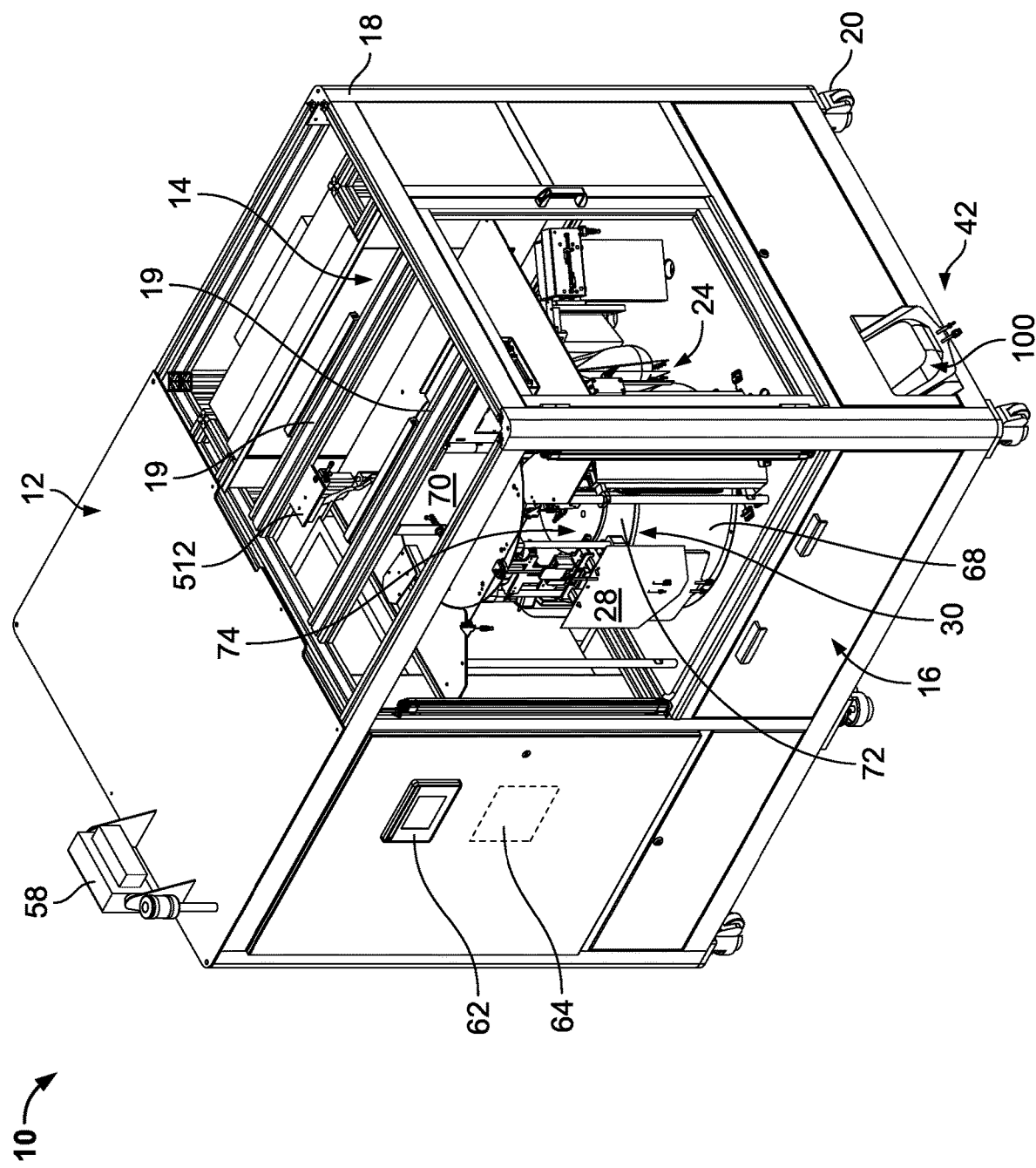
FIG. 1 is a perspective view of an automated small scale solution manufacturing machine in accordance with the teachings of the present disclosure.
Figure 2:
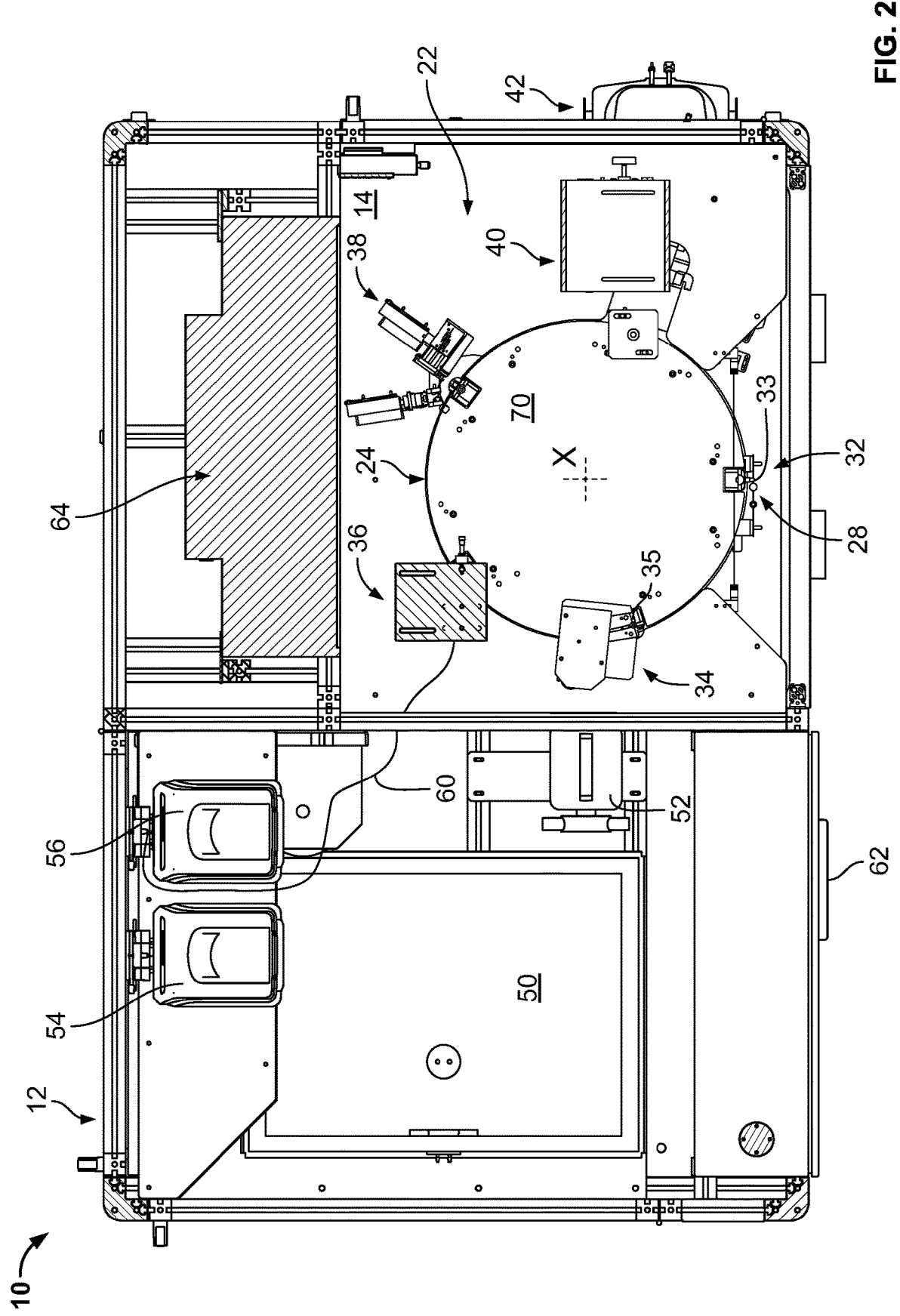
FIG. 2 is a top view of the small scale solution manufacturing machine of FIG. 1.
Figure 3:
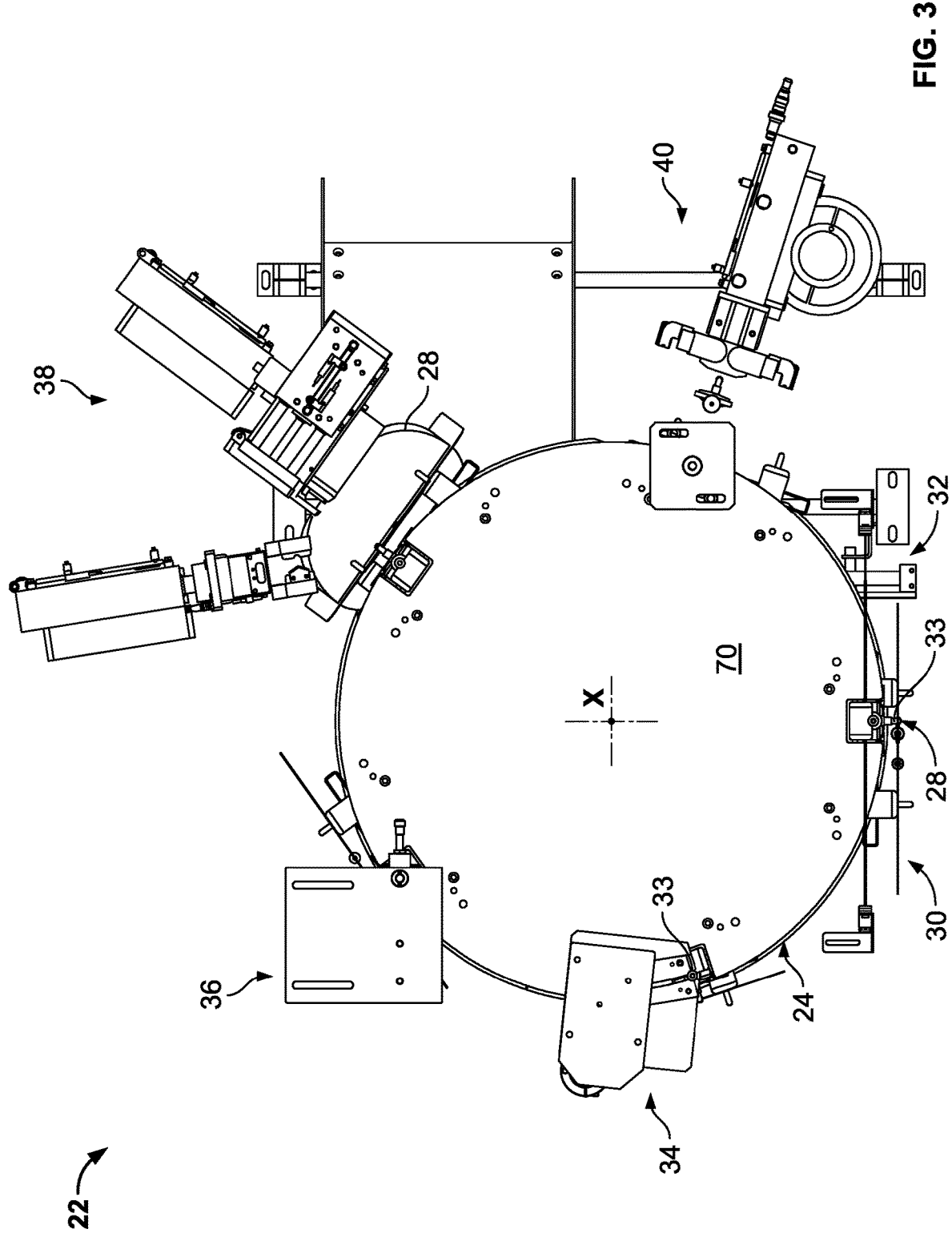
FIG. 3 is a top view of a product bag processing system in accordance with the teachings of the present disclosure.

A machine for providing sealed product bags filled with a sterile solution is illustrated in FIGS. 1-3. The machine illustrated and described herein provides quality assurance for each solution-filled product bag by individually testing the integrity of the filling process after filling. In a preferred embodiment, the machine 10 may be portable and self-containing, having small-scale production capabilities.

In FIGS. 1 and 2, the machine 10 contains the equipment necessary to fill product bags with sterile solution, seal the product bags, and assure the quality of the solution in the product bag before unloading. The machine 10 provides a solution and distribution compartment 12, a product bag assembly compartment 14, and a storage compartment 16. As illustrated, the machine 10 has a cubicle base frame 18 with ceiling rails 19 and is mounted on a plurality of wheels 20. Each compartment 12, 14, 16 may be screened or otherwise separated from the environment and the other compartments by screens, hoods, paneling, drawers, partitions, and/or doors.

The product bag assembly compartment 14 houses a processing system 22 (also shown in FIG. 3) which includes a carousel assembly 24 and a plurality of stations 34, 36, 38, 40 disposed around the carousel assembly 24. A single product bag 28 is attached to one of a plurality of cradle assemblies 30. Each cradle assembly 30 is supported and rotated by the carousel assembly 24 so that the product bag 28 rotates to each of five positions which correspond to five stages of the processing system 22. For ease of reference, a single cradle assembly 30 will be described as it travels to each position of the product bag processing system 22. While the processing system 22 is configured to process multiple product bags 28 at different stages simultaneously, one cradle assembly 30 will be described as "the cradle" and its respective product bag 28 will be described as "the product bag" as it completes a full rotation. The "loaded cradle" refers to the cradle assembly 30 having the secured bag 28 attached, and the "filled product bag" refers to the status of the product bag 28 after receiving the dispensed solution. A particular "position" may be the location of the loaded cradle assembly 30 when at rest at a particular station or stage of the process.

FIGS. 2-3 illustrate a top view of the processing system 22. The carousel assembly 24 rotates the plurality of cradle assemblies 30 about a central axis X in five equally-spaced intervals. At a loading stage 32 (or loading position) of the processing system 22, a product bag 28 is secured to one of a plurality of movable cradle assemblies 30 attached to the carousel assembly 24. The bag 28 may be loaded manually or with a machine. At a cap removal station 34 (or cap removal stage), a sterile closure cap of the product bag 28 is removed to prepare the product bag 28 to be filled with a solution at a filling station 36. At the filling station 36 (or filling position), the product bag 28 is at least partially filled with a fluid pumped from the solution and pumping compartment 12 (FIG. 2). After the product bag 28 is filled to a predetermined amount, the filled product bag 28 is sealed and cut at a sealing and cutting station 38 (or sealing and cutting position). At a testing and unloading station 40 (or testing and unloading position), a filter integrity test is performed on a filter of the product bag 28 to determine the quality of solution in the filled product bag 28. Based on the results of the test, the filled product bag 28 is removed from the cradle assembly 30 and is directed into either an exit chute 42 or into the storage compartment 16. The storage compartment 16 is located beneath the product bag assembly compartment 14 to collect waste.

The machine 10 may provide air filtration and purification devices and systems in the product bag assembly 14 and the solution and distribution compartments 12. A HEPA filter 64 adjacent to the processing system 22 maintains a clean working environment within the product bag assembly compartment 14. In some versions, the product bag assembly compartment 14 may also be located under a hood which provides a constant pressure gradient to eliminate contaminants from the environment. In yet another embodiment, the air of the product bag assembly compartment 14 may be filtered using ultraviolet light technology, such as ultra violet germicidal irradiation, that may either supplement or replace the HEPA filter 64 or other filtration methods and/or devices. Additional processes for assembling and installing the machine 10 may be automated to avoid contamination. For example, a nozzle, which connects a mixing bag in the solution and distribution compartment 12 with the filling station 36 in the product bag assembly compartment 14, may have a sterile closure cap that is removed in an automated fashion by a machine or a device after the nozzle is installed and the compartment 14 has been adequately filtered.

As best illustrated in FIG. 2, the solution and distribution compartment 12 includes a mixing tank 50, a sump pump 52, a recirculation pump 54, and a fill pump 56. The mixing tank 50, which includes a mixing bag held in a holding tank (not illustrated), is measured on a scale, or a load cell, which monitors the concentration of the contents of the mixing tank 50, and relays the amount of solution in the mixing bag via a monitor 58 (illustrated in FIG. 1). For example, the scale may determine how much diluent, or water, has been added to the mixing bag. If the mixing bag is preloaded with a concentrate, the scale may determine the concentration (diluent volume to concentrate ratio) of the contents. If the mixing bag is not preloaded with a concentrate, the scale may determine the volume of water added to the tank. In an embodiment, the mixing bag has a sterile interior and the fluid provided to the mixing bag is sterile. The recirculation pump 54 is connected to a tube for mixing the contents of the mixing bag. The fill pump 56 is attached to a fill tube 60 which fluidly connects the solution from the mixing bag to a nozzle at the filling station 36, described in more detail below. The fill tube 60 may include at least two sterilizing filters that filter the solution before it reaches the filling station 36. Other methods or devices readily available to a skilled person in the art may be used to produce the solution. For example, in-line mixing technology, such as that described in U.S. Pat. No. 8,271,139, the disclosure of which is incorporated by reference herein, may replace the mixing bag. By accessing a control panel 62 of an on-board central processing unit 64 (illustrated in FIG. 1), an operator may control a number of parameters relating to the solution of the mixing bag, such as amount of liters in a batch to fill the mixing bag and time needed to mix the solution. The operator may also control operations related to the mixing process of the mixing tank 50 such as operating an autocycle and draining the contents of the mixing bag into sump.

The on-board central processing unit (CPU) 64 of the machine 10 (illustrated in FIG. 1) operates and controls the automated processing system 22 by communicating with the recirculation and fill pumps 54, 56, the carousel assembly 24, and various tooling devices at the stations 34, 36, 38, 40. Generally, the CPU 64 is configured to receive signals from proximity switches, transmit commands or signals to actuating devices, monitor sensors, and process information gathered and received from the sensors. For example, the CPU 64 communicates with the fill pump 56 to begin pumping fluid and to stop pumping fluid when a product bag is filled at the filling station 36. Concurrently, the CPU 64 monitors the testing station 40, processes the results of the filter integrity test, and unloads a filled product bag 28 based on the processed results. The CPU 64 then relays a signal to the carousel assembly 24 to rotate one interval. The operation of the CPU 64, as it relates to each station 34, 36, 38, 40 of the system 22, will be described in more detail below. In the illustrated example, the CPU 64 controls the processing system 22 locally and may be accessed by the control panel 62 located on an outer wall of the machine 10. In other embodiments, the CPU 64 may remotely control the processing system 22 of the machine 10 via wireless communication systems.

As discussed above, the CPU 64 controls the automated rotation and at the aspects of the processing system 22 by communicating with the carousel assembly 24. FIG. 4 illustrates that the carousel 24 includes various internal components 65 mounted to a core 66 a protective shield 68 (FIG. 1) and a top plate 70 (FIGS. 1-3). A rotating carousel plate (or carousel) 72 and a central stationary tool plate 74 are illustrated in both FIGS. 1 and 4. The internal components 65 are mounted to the core 66 at a position relative to a corresponding station and may include a servo indexer 76 or other drive mechanism, sensing devices, and/or linear and rotational actuators. The tool plate 74 and the core 66, which share the central axis X with the carousel 72, remain stationary as the servo indexer 76 rotates the carousel plate 72. The servo indexer 76 receives command signals from the CPU 64 to rotate the carousel plate 72 in intervals, and pauses before receiving a command to rotate the carousel plate 72 again. The stations 34, 36, 38, 40 are optimally located about a perimeter of the carousel assembly 24 and relative to the internal components 65 of each station to perform its designated task when the carousel assembly 24 is at rest.

As used herein, the term "tooling" may be used to describe any device, mechanism, apparatus, or actuator, including tubes, diverters, load cells, sensors, proximity switches, etc., that are assigned to a particular stage and/or station 34, 36, 38, 40 of the processing system 22, and are positioned relative to the station 34, 36, 38, 40 to perform an assigned task of the process. The tooling may be externally located from the carousel assembly 24 or may be one of the internal components 65 mounted to the core 66. The tooling, whether externally or internally located relative to the carousel assembly 24, may directly or indirectly interact with the product bag 28 as the product bag 28 reaches each station. Such interactions as described herein, include but are not limited to measuring, cutting, sealing, engaging, removing, connecting, and/or gripping various parts or components of the product bag 28.

FIGS. 5-8 illustrate first and second exemplary product bags 28 that can be used in the processing system 22. These product bags, various components and characteristics thereof, and other examples that could be used in the disclosed process and machine are disclosed in U.S. Provisional Patent Application No. 62/281,799, entitled "STERILE SOLUTION PRODUCT BAG," filed Jan. 22, 2016, and European Patent Application No. EP16152332.9, entitled "FILTER MEMBRANE AND DEVICE," filed Jan. 22, 2016, the entirety of each being expressly incorporated herein by reference. In the first illustrated example of FIGS. 5-6, a product bag 100 includes a bladder 102, a stem 104, a filter 106 disposed in-line with the stem 104, and a sterile closure cap 108. The bladder 102 is a fillable pouch that can have a standard volume capacity. The interior of the product bag 100 is pre-sterilized. At least partially surrounding a perimeter of the fillable pouch is a sealed border 110 having a plurality of apertures 112 configured to receive mounting pins 210a, 210b (FIG. 9) for placing the bag 100 in the machine 10. The bladder 102 is fluidly connected to the stem 104 at an opening 114 at a first end 116 of the bladder 102. Administration and medication ports 118, 120 are disposed at a second end 122 of the bladder 102.

The stem 104 is a narrow tube that fluidly connects an inlet 124 of the stem 104 to the opening 114 of the bladder 102. The stem 104 includes a tapered head 126 defining the inlet 124, a collar 128 connecting a first stem part 130 to the tapered head 126, a second part 132, and a duct 134 defining a stem outlet 136. The sterile closure cap 108, in this version, has a hemispherical knob 138 attached to a neck 140 that sealably covers or is inserted into the inlet 124 of the stem 104 and maintains the sterility of the interior during storage and distribution. The filter 106, in this version, has a flat filter membrane 142 disposed in-line with the stem 104 between the first and second parts 130, 132 of the stem 104. The tapered head 126 may be a female fitting that sealingly engages a male, luer fitting of the machine 16 during filling, as described below and illustrated in FIG. 21.

So configured, a solution may enter the inlet 124 of the stem 104 and pass through the head 126 and into the first part 130 toward an inlet 144 of the filter 106. The solution then passes through the flat filter membrane 142, out a filter outlet 146, and into the second part 132 of the stem 104. The duct 134 directs the filtered solution from the second part 132 and to the opening 114 of the bladder 102. The second part 132 of the stem 104 is defined by the area of the stem 104 between the outlet of the filter 146 and an inlet 148 of the duct 134 and may be referred to as a cut and seal area 132. The stem 104 provides an isolated fluid connection between the inlet 124 and the bladder 102, such that once the solution is filtered through the filter membrane 142, the filtered solution passes directly into the sterilized environment of the bladder 102.

The filter 106 illustrated in FIGS. 5-6 is a membrane filtration device and in one version can include the membrane filter disclosed in U.S. Pub. No. 2012/0074064 and PCT/EP2015/068004, which are incorporated herein by reference. The present disclosure is not limited to the filter 106 of FIGS. 5-6.

An alternative product bag 150 illustrated in FIGS. 7-8 includes a similar bladder 152 and a sterile closure cap 154 to the first product bag 100. In the second example, a filter 155 is disposed within a stem 156. The stem 156, which may be tapered or cylindrical, does not provide a separate inlet and outlet connection ports for the filter 155 as illustrated in the product bag 100 of FIGS. 5-6. Instead, the filter 155 conforms to the shape of the stem 156 such that the stem 156 does not have any breaks or bends to accommodate the filter 155 or filtration device. The filter material may be a fibrous material designed and rated to be a sterilizing grade filter. In an embodiment, the fibrous material may be produced with a porosity of ~0.2 microns (μm). In other embodiments, the filter 155 may be a cylindrical hollow tube filter of a polymer material with 0.2 micron (μm) pores. In other embodiments, the porosity can vary to address filtration requirements. By way of example, the porosity can be less than 0.2 micron. Other versions of sterilizing grade filters are also contemplated. Reference numbers not included or that have the same numbers in FIG. 7-8 indicate similarly or identical elements of the product bag 100 in FIG. 5-6.

The filter pore size for product bags 100, 150 effectively sterilizes the solution and removes non-viable contaminants as the solution passes through the inlet 124 of the stem 104 and into the bladder 102 at the bladder opening 114. While the product bag 100 of FIGS. 5-6 is illustrated throughout the following figures describing the filling machines and process of the present disclosure, the product bag 100 may be replaced by the second exemplary product bag 150 illustrated in FIGS. 7-8. Moreover, the product bag 100, 150 is not limited to the two examples 100, 150 illustrated in FIGS. 5-8, but may be any product bag having a filtering capacity and that adequately sterilizes the solution and removes non-viable contaminants in the solution. Materials of the product bag may vary according to the solution being processed, and are not limited to the materials described herein. As referred herein, the term "solution" is a fluid, such as saline and/or any type of fluid medicinal product. Sterilization and contaminant removal requirements as it relates to filter pore size may vary according to the fluid being processed.

Figure 10:
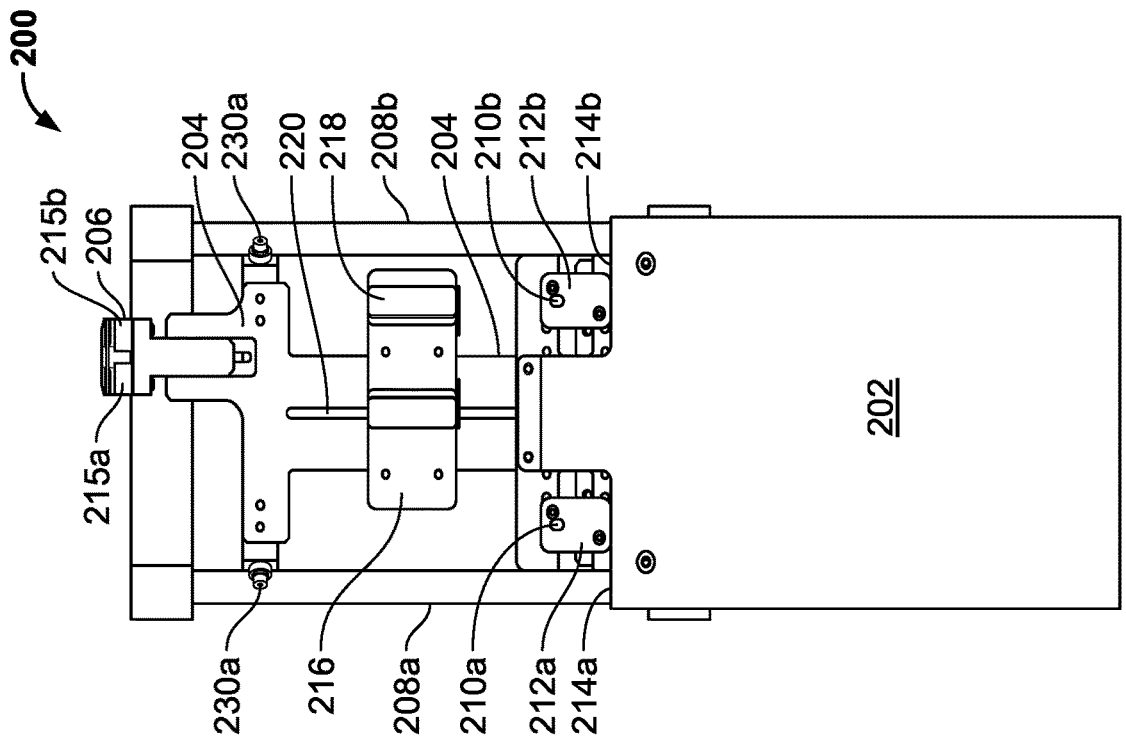
FIG. 10 is a front view of the cradle assembly of FIG. 9.
Figure 9:
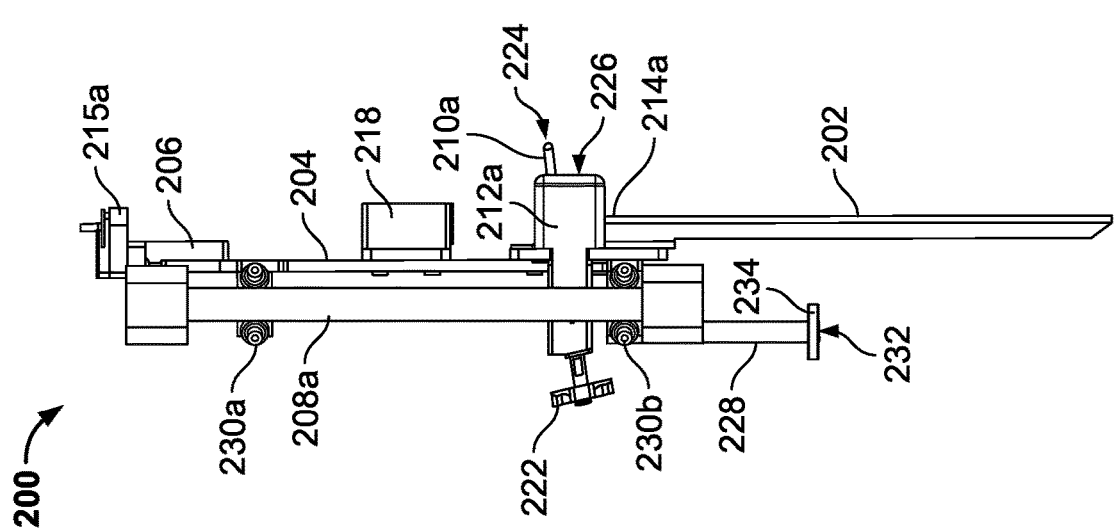
FIG. 9 is a side view of a cradle assembly in accordance with the teachings of the present disclosure.
Figure 11:
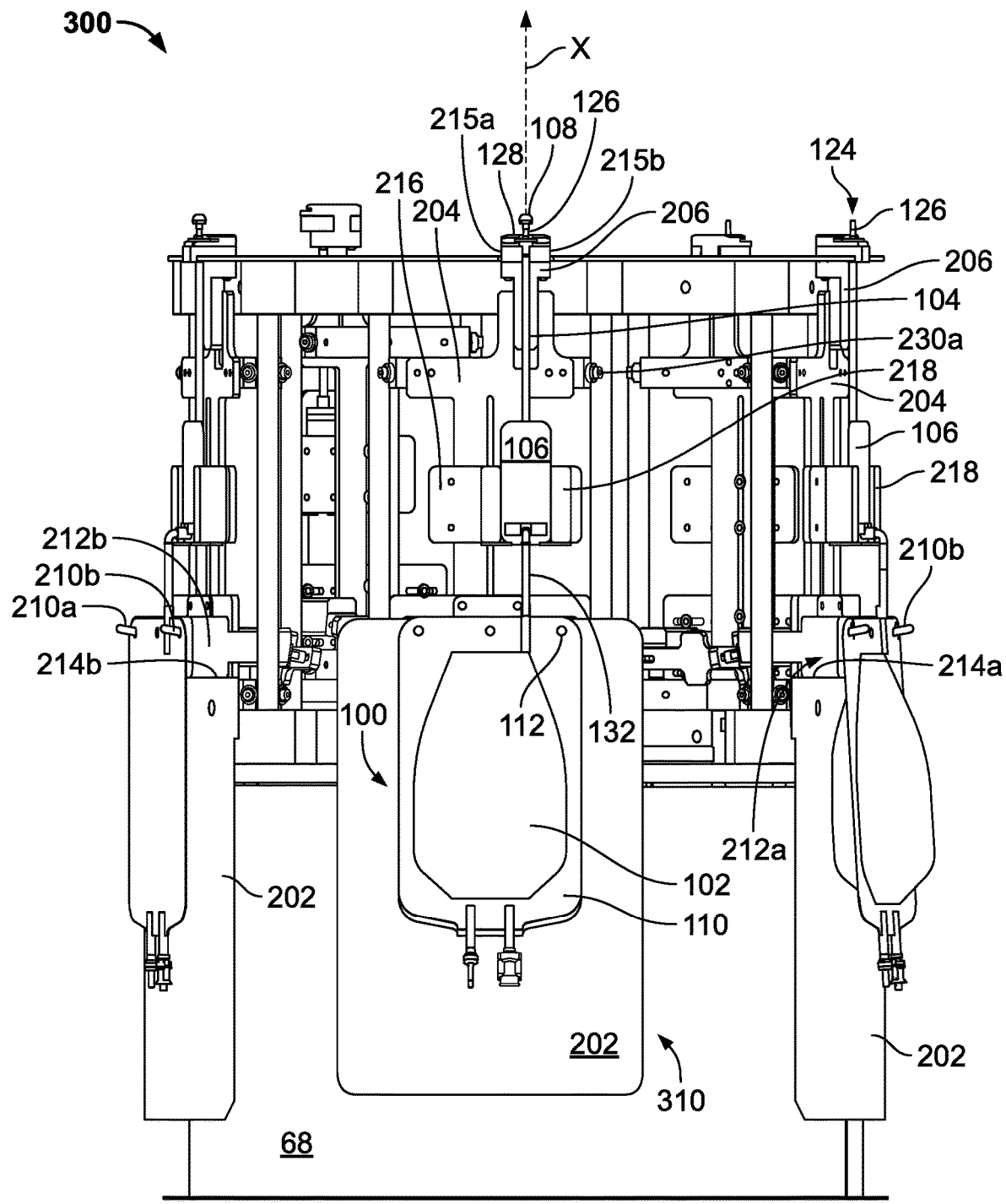
FIG. 11 is a side view of an assembled carousel assembly carrying a plurality of cradle assemblies of FIGS. 9-10 loaded with the product bag of FIGS. 5-6.

FIGS. 9-10 illustrate a movable cradle assembly 200 that is configured to receive and carry a product bag 100, 150. The cradle assembly 200 includes a product bag support plate 202, a back plate 204, and a nest 206 that can move together as a unitary piece along first and second parallel guide bars 208a, 208b. First and second hang pins 210a, 210b are housed in first and second pin support blocks 212a, 212b, respectively, which are supported by first and second shoulder brackets 214a, 214b of the support plate 202. The pin support blocks 212a, 212b align the hang pins 210a, 210b to the plurality of apertures 112 of the sealed border 110 of the product bag (FIGS. 5, 7). The product bag 100 is secured to the cradle assembly 200 by sliding the first and second mounting hang pins 210a, 210b through the apertures 112 of the product bag 100. The bladder 102 is supported by the bag support plate 202 when the bag 100 is secured by the hang pins 210a, 210b (FIG. 11).

The nest 206, which is attached to the back plate 204, includes first and second gripping fingers 215a, 215b that releasably grip the collar 128 of the stem 104 (FIGS. 5, 7) when the product bag 100 is loaded to the cradle assembly 200. The back plate 204 carries a filter support plate 216 having parallel filter support prongs 218. The filter support plate 216 is aligned with the nest 206 and may be manually adjusted along a track 220 formed in the back plate 204 according to the placement of the filter 106 relative to the collar 128. For example, the filter support plate 216 may be adjusted to accommodate a different length of the stem 104. Additionally, the support prongs 218 may be adjusted to accommodate a different width of the filter 106 such as the narrow filter 155 of the product bag 150 in FIGS. 7 and 8.

The hang pins 210a, 210b are retained within an angled bore of their respective support blocks 212a, 212b. A connecting pull bar 222 (FIG. 9) couples the hang pins 210a, 210b such that the pins 210a, 210b may slide together between an engaged position and a released position. In the engaged position depicted in FIG. 9, a first end 224 of the pin 210a extends through a face 226a of the support block 212a at an angle relative to the bag support plate 202. In the released position (not illustrated), the first end 224 of the pin 210a (210b) is retracted into the block 212a (212b), compressing a spring disposed within the angled bore of the support block 212a (212b). When the pull bar 222 is pulled in a direction away from the from the cradle assembly 200, the pins 210a, 210b retract together into their respective support blocks 212a, 212b, occupying the released position. As the pins 210a, 210b retract, the pins 210a, 210b slide out of and away from the apertures 112 of the product bag 100, thereby releasing the bag 100 from the cradle assembly 200. When the pull bar 222 is released, the compression spring returns the pins 210a, 210b to the engaged position.

As illustrated in FIG. 9, an actuating shaft 228 is coupled to the support plate 202 back plate 204, and nest 206, as well as, first and second guide rollers 230a, 230b, which in turn are slidably coupled to the guide bars 208a, 208b. The guide rollers 230a, 230b allow the support plate 202, the back plate 204, and the nest 206 to move relatively with minimal friction and/or resistance along the guide bars 208a, 208b when the actuating shaft 228 is moved. The guide rollers 230a, 230b enable the cradle assembly 200 to remain aligned with the guide bars 208a, 208b as the assembly 200 moves between a rest position and an elevated position. FIGS. 9 and 10 illustrate the cradle assembly 200 in the rest position. A button 232 and a flange 234 are attached to a free end of the shaft 228, for receiving an upwards axial force to move the support plate 202, back plate 204, next 206, vertically upwards at certain positions in the filling machine 10. For example, at the filling and testing stations 36, 40, the cradle assembly 200 may be lifted and lowered as a unit in a vertical direction V (i.e., a direction parallel to the central axis X of the carousel assembly 24) to engage with the tooling at each station 36, 40. The cradle assembly 200 is not limited to the structure as illustrated and described herein.

Figure 12:
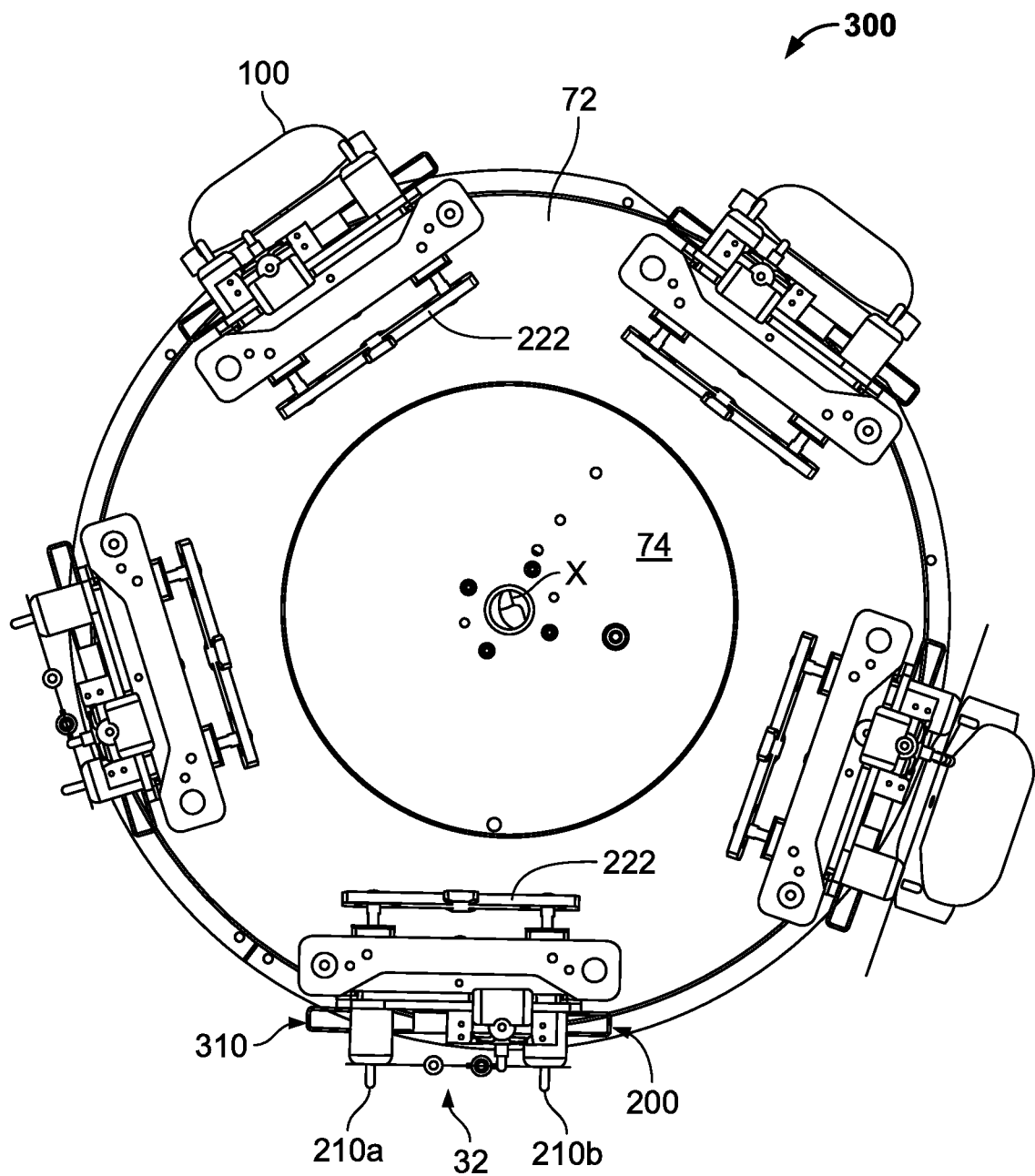
FIG. 12 is a top view of the assembled carousel assembly of FIG. 11.
Figure 13:
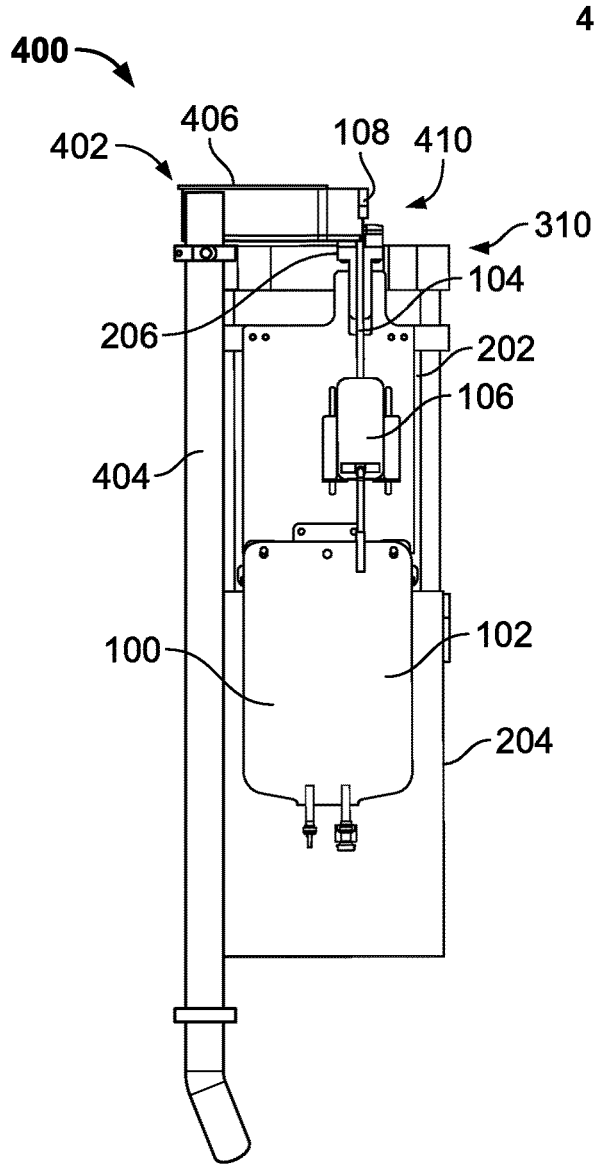
FIG. 13 is a front view of a cap removal station interacting with the loaded cradle assembly of FIG. 11.
Figure 30:
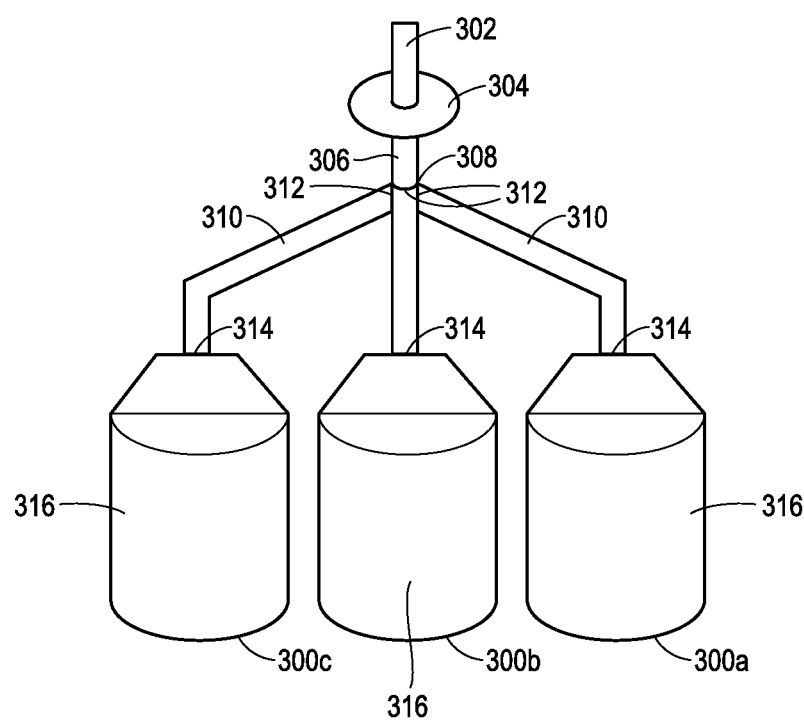
FIG. 30 is a front view of a product bag with multiple bladders connected by sealable tubing to a single filter.

FIGS. 11-12 illustrate an assembled carrousel assembly 300 having the plurality of cradle assemblies 200, each loaded with a product bag 100, and evenly disposed about a perimeter of the carousel plate 72. A servo indexer 76 (FIG. 4), or other actuating device known in the art, rotates the carousel plate 72 in evenly spaced intervals in a clockwise rotation about the central axis X. At a loading position 32 (seen in FIG. 12), an empty product bag 100 is secured to the cradle assembly 200, together forming a loaded cradle 310. As illustrated in FIG. 11, the first and second gripping fingers 215a, 215b of the nest 206 releasably grip the collar 128 of the stem 104 such that the sterile closure cap 108 and tapered head 126 are positioned above the nest 206. The filter 106 is rigidly supported by the filter support prongs 218 of the filter support plate 216 and is aligned with the stem 104 and opening 114 of the bladder 102. FIG. 12 illustrates a top view of the loaded cradle assembly 310, where the pull bar 222 and the first and second hang pins 210a, 210b are in the engaged position to hold the product bag 100 against the support plate 202. In another embodiment, a magazine holding a plurality of product bags may be loaded to the cradle assembly at the loading position. After a complete rotation of the carousel, a product bag from the magazine may automatically replace the previous product bag. In yet another embodiment, the cradle assembly 200 may be loaded with a bag unit having multiple bladders sealably connected by a single stem or other configuration, as illustrated in FIG. 30 and described in more detail below, such a bag unit and various components and characteristics thereof being disclosed in U.S. Provisional Patent Application No. 62/281,799, entitled "STERILE SOLUTION PRODUCT BAG," filed Jan. 22, 2016, European Patent Application No. EP16152332.9, entitled "FILTER MEMBRANE AND DEVICE," filed Jan. 22, 2016, PCT/EP2017/051044, entitled "FILTER MEMBRANE AND DEVICE," filed Jan. 19, 2017, and PCT/US17/14253, entitled "STERILE SOLUTIONS PRODUCT BAG," filed Jan. 20, 2017, the entirety of each being expressly incorporated herein by reference. In this example, the solution is dispensed at the filling station 36, filtered by a single filter disposed in-line with the stem, and then distributed to the multiple bladders.

In one version, the aforementioned bag with multiple bladders can take the form depicted in FIG. 30, which provides a multi-bag filling set having three product bags 300a, 300b, and 300c (which can also be referred to as three bladders of a common product bag) connected by sealable tubing 302 to a single filter 304. A first part 306 of the sealable tubing 302 is connected to the filter 304 or to a stem surrounding the filter 304. The first part 306 of the sealable tubing 302 can extend to a juncture 308 where a plurality of second parts 310 of sealable tubing 302 can be connected at their respective first ends 312. Each second part 310 can be connected at a second end 314 to a respective bladder 316 of product bags 300a, 300b, and 300c. After each bladder 316 is filled, the second part 310 of the sealable tubing 302 may be sealed and cut. With the configuration disclosed in FIG. 30, fluid can be introduced into the filter 304 and past to the bladders or bags 300a, 300b, 300c via the second parts 310 of sealable tubing 302. In one version, fluid may pass generally simultaneously and generally in equal portions from the filter 304 to the second parts 310 of sealable tubing 302 thereby generally simultaneously filling each of the bladders or bags 300a, 300b, 300c. In other versions, fluid may pass generally sequentially to the different bladders or bags 300a, 300b, 300c. For example, in some versions, fluid may first pass from the filter 304 to the first bladder or bag 300a, valves (not shown) associated with the second and third bladders or bags 300b, 300c are closed. Upon the first bladder or bag 300a being filled, a valve (not shown) with the first bladder or bag 300a can be closed and the valve associated with the second bladder or bag 300b can be opened to provide for filling of the second bladder or bag 300b. Upon the second bladder or bag 300b being filled, the valve (not shown) with the second bladder or bag 300b can be closed and the valve associated with the third v 300c can be opened to provide for filling of the third bladder or bag 300c. Finally, upon the third bladder or bag 300c being filled, the valve (not shown) with the third bladder or bag 300c can be closed. The valves associated with the bladders or bags 300a, 300b, 300c can be positioned on the second parts 310 of the sealable tubing 302 associated with each of the bladders or bags 300a, 300b, 300c or on the bladders or bags 300a, 300b, 300c themselves. In another version, the system could include a single three-way valve disposed at the juncture 308 for directing fluid toward and away from the various bladders or bags 300a, 300b, 300c.

The term actuator, as referred to herein, includes a motor that moves or controls a mechanism or system that may be powered by electric current, hydraulic fluid pressure, or pneumatic pressure. The carousel described herein may be controlled or operated by a rotary actuator, but other embodiments may include a linear actuator. For example, the carousel may be replaced with a linear assembly line, such as a conveyor belt, that moves in spaced intervals between positions and/or stations. In this example, the stations would be positioned relative to the linear conveyor belt or other method of linear conveyance to perform each process involved and required for filling bags of sterile solution.

Station I. Cap Removal Station

Figure 15:
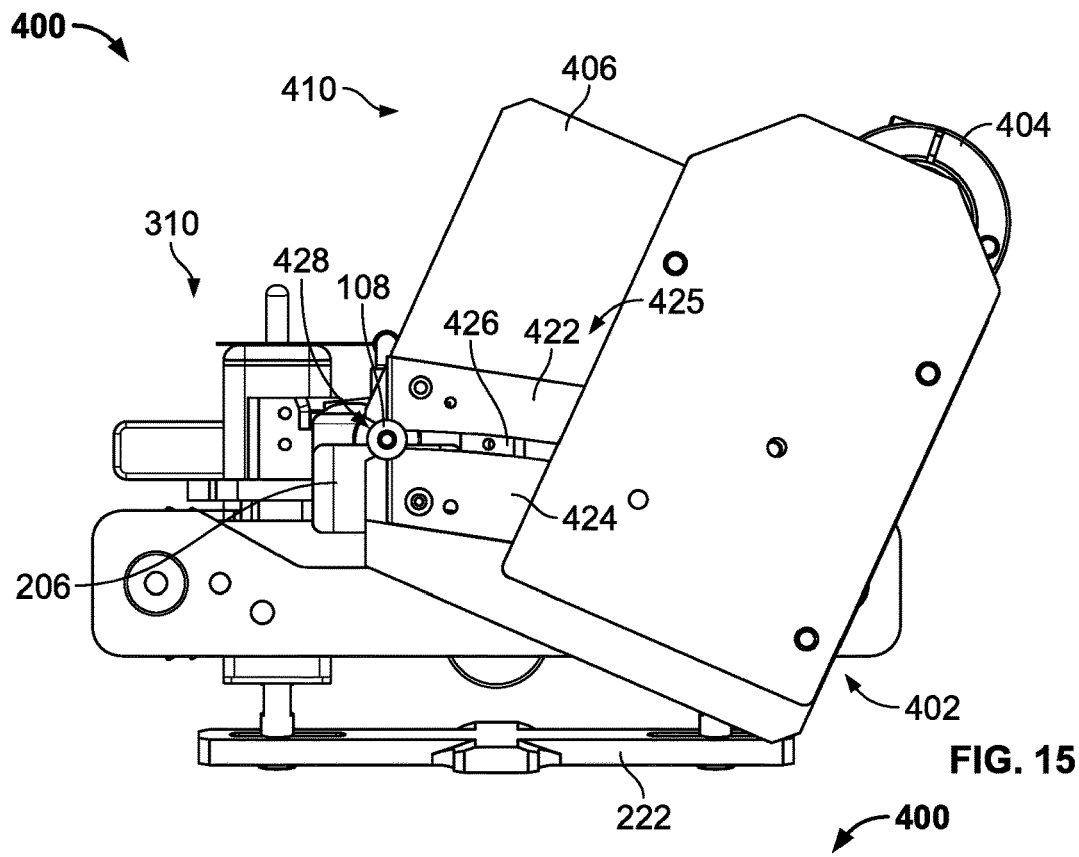
FIG. 15 is a top view of the cap removal station and loaded cradle of FIG. 13.
Figure 16:
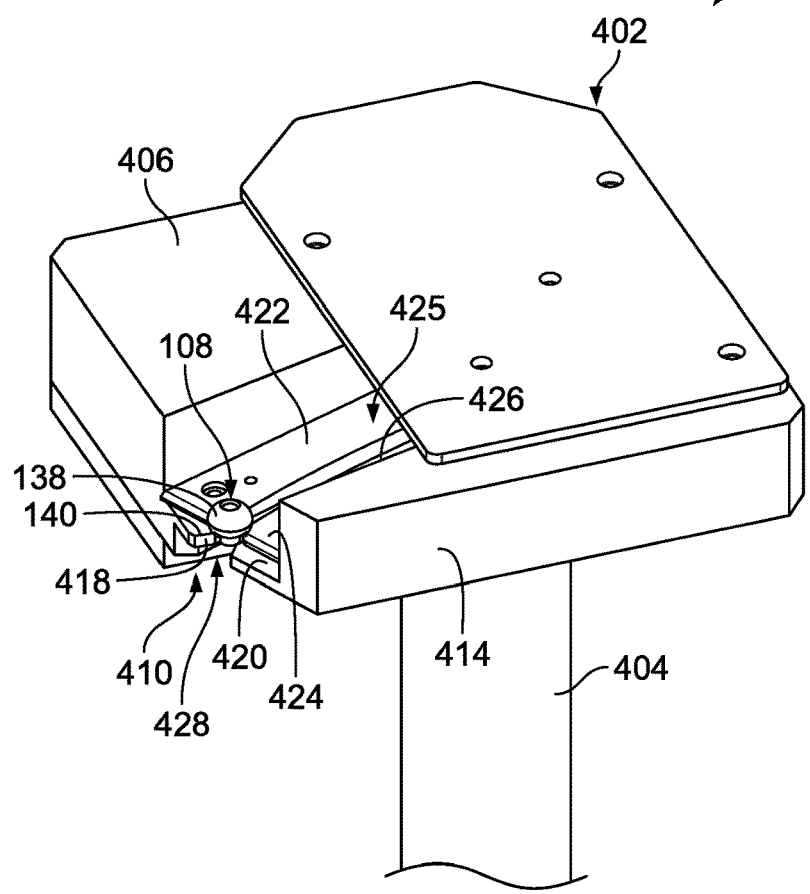
FIG. 16 is a partial perspective view of a cap removal tooling of the cap removal station of FIG. 13.
Figure 17B:
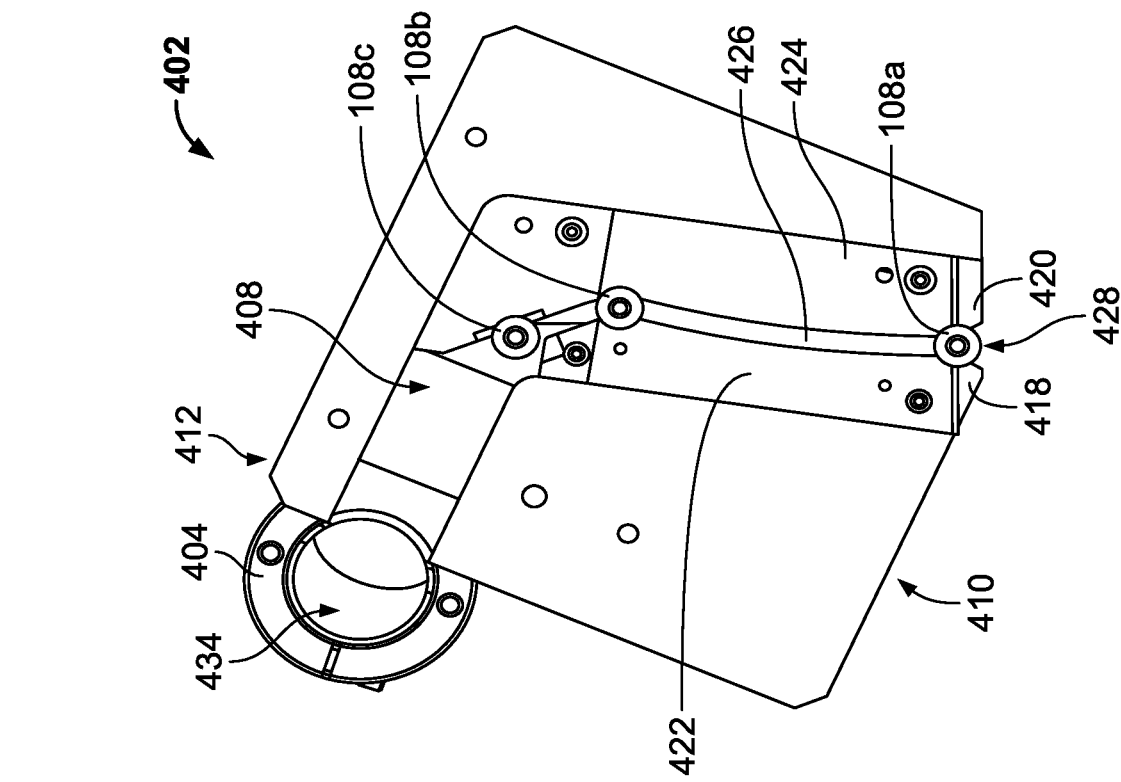
FIG. 17B is cross-sectional view B-B of FIG. 17A.
Figure 17A:
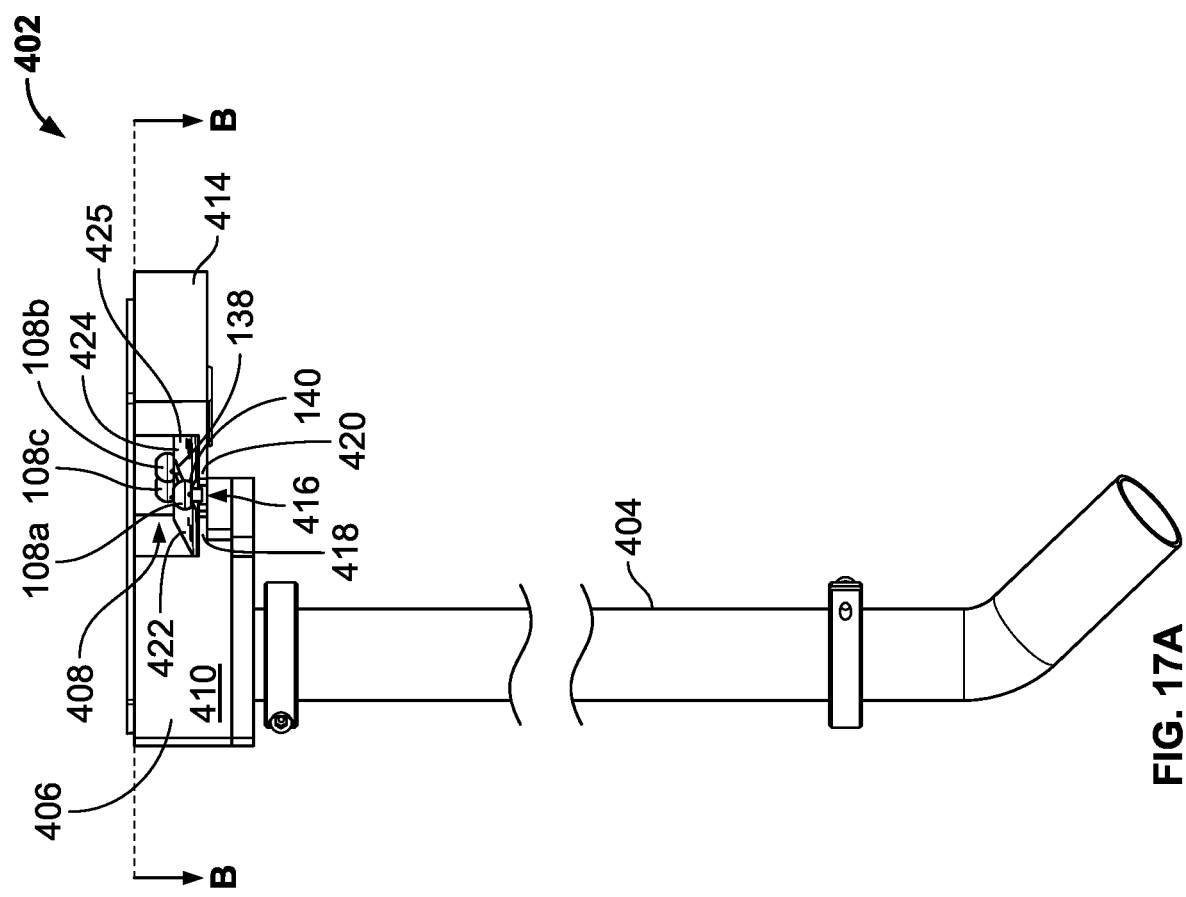
FIG. 17A is a partial side view of the cap removal tooling of FIG. 16.

Referring now to FIGS. 13-17B, the loaded cradle 310 is moved to the cap removal station 34 (FIG. 3) to perform sterile closure cap removal. A cap removal tooling 400 positioned at the station 34 includes a forked ramp device 402 and connecting scrap tube 404. In a preferred embodiment, a base block 406 of the ramp device 402 includes a recess 408 defining a sterile closure cap travel path from a first end 410 of the block 406 to a second end 412 of the block 406 where the sterile closure cap 180 is deposited into the scrap tube 404 (FIG. 17B). As most clearly illustrated in FIG. 17A, the first end 410 of the block 406 has an L-shaped cross-section forming a shelf 414. A slot 416 formed in a portion of the recess 408 is defined by a first seat 418 and a second seat 420. A cross-sectional view A-A of FIG. 14A is illustrated in FIG. 14B and is taken at a midpoint of the slot 416 to illustrate the shelf 414 and the second seat 420. The shelf 414 is sized to provide a clearance, as shown in FIG. 14A, for the nest 206 of the cradle 310 to pass under the block 406 as it moves passed the cap removal tooling 400.

Figure 14B:
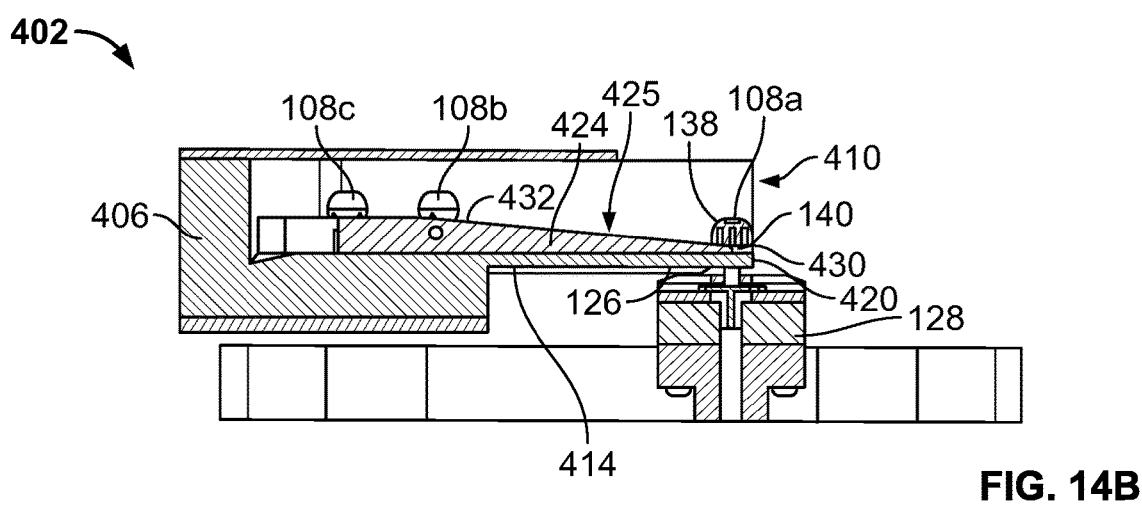
FIG. 14B is cross-sectional view A-A of FIG. 14A.

As depicted in FIGS. 15-17B, first and second ramped inserts 422, 424 are attached to first and second seats 418, 420 within the recess 408 to form a ramp feature 425 and a channel 426. The channel 426 effectively narrows the slot 416 and provides a width that is both larger than a diameter of the neck 140 of the sterile closure cap 108 and smaller than a diameter of the knob 138 of the sterile closure cap 108 (FIGS. 16, 17A). In the FIGS. 14B, 17A-17B, three sterile closure caps are illustrated at three different locations along the channel 426 of the ramp device 402 to illustrate the cap removal and disposal process. For example, a first sterile closure cap 180a engaged with the stem 104 is located at a mouth 428 of the channel 426 when the loaded cradle 310 is at rest at the cap removal station 34 (FIG. 15). As depicted in FIG. 14B, the neck 140 of the sterile closure cap 108 is positioned at a height parallel to a low point 430 of the ramp 425. The channel 426 may be slightly curved, as illustrated in FIG. 17B, to correspond with a trajectory of the stem 104 as the carousel 72 rotates the cradle 310 from the cap removal station 34 to the filling station 36. As the carousel 72 rotates the cradle 310 passed the cap removal tooling 400, the sterile closure cap 108 is guided through the channel 426 and becomes separated from the stem 104 as the sterile closure cap 108 travels up the ramp 425 (FIGS. 17A-17B). A second sterile closure cap 108b is located at a top point 432 of the ramp 425 (FIGS. 14B, 17A) after the neck 140 of the sterile closure cap 108 disengages from the inlet 124 of the stem 104. The sterile closure cap 108 is then diverted toward an opening 434 of the scrap tube 404, as illustrated by a third sterile closure cap 108c in FIG. 17B. The sterile closure cap 108 may not be removed from the stem 104 until the cradle 310 moves from the cap removal station 34 to the filling station 36 to minimize a time period for the introduction of environmental contaminants while the inlet 124 of the stem 104 is uncovered and exposed to the processing compartment environment.

Figure 14A:
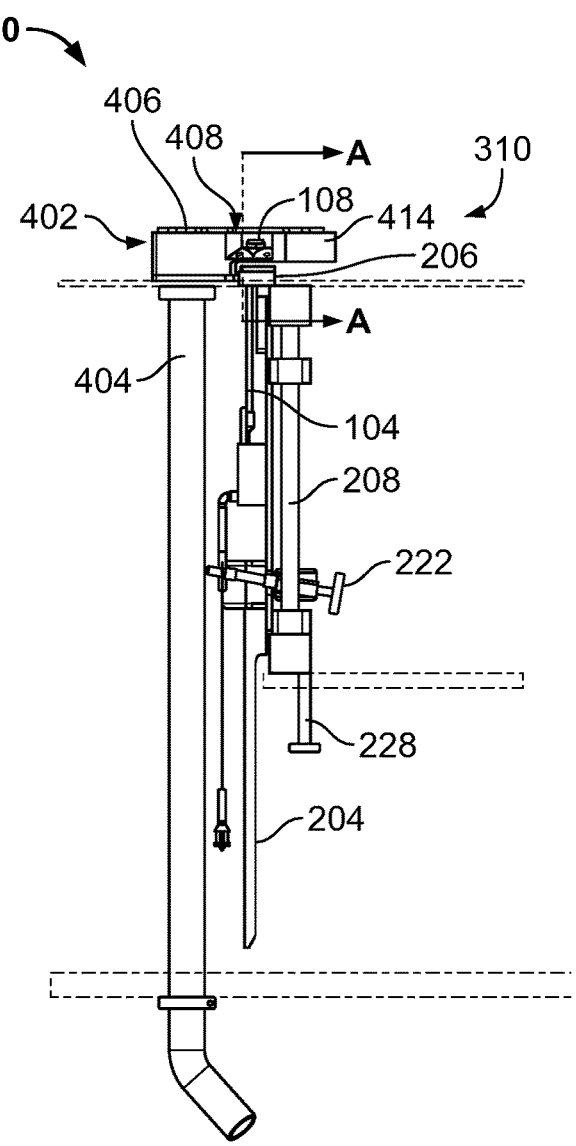
FIG. 14A is a side view of the cap removal station and loaded cradle of FIG. 13.

The cap removal tooling 400 engages the neck 140 of the sterile closure cap 108 to remove the sterile closure cap 108 from the inlet 124 of the stem 104 in a sterile manner as the loaded cradle 310 passes the cap removal tooling 400 when the carousel 72 rotates (FIG. 14A). The scrap tube 404 collects the sterile closure caps and discards the removed caps to the storage bin compartment 16. Although the illustrated example provides for an automated method, the sterile closure cap 108 may be removed manually or by other means. After the sterile closure cap 108 is removed the machine automatically rotates the loaded cradle number to the filling station 360.

Station II. Filling Station

Figure 18:
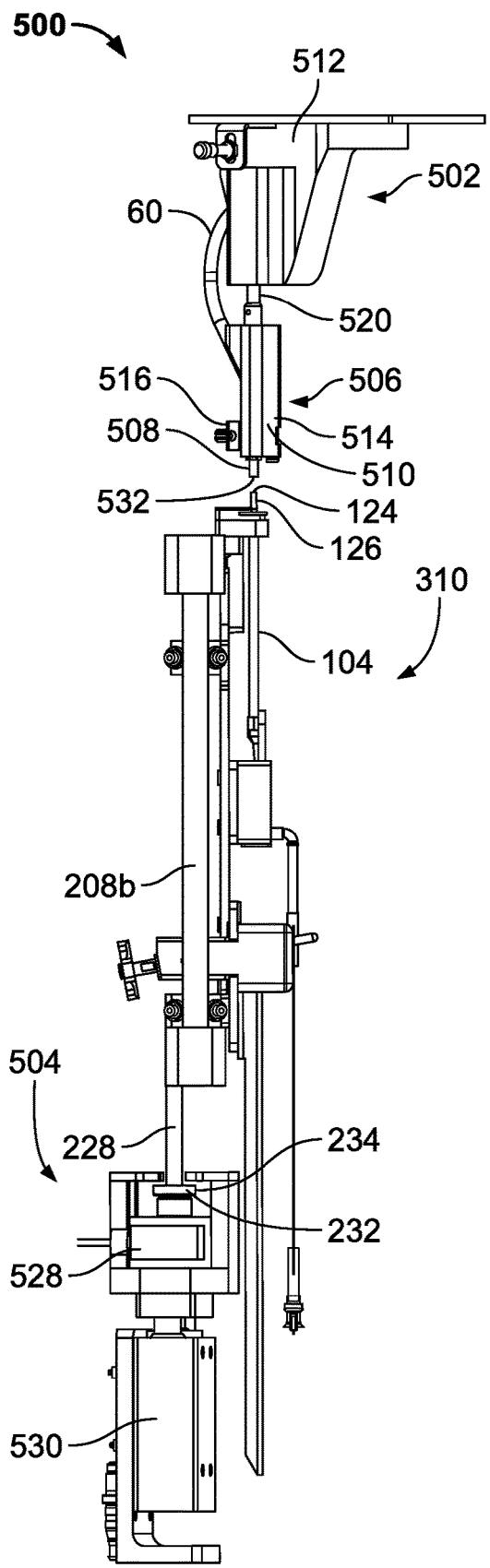
FIG. 18 is a side view of a filling station aligned with the loaded cradle assembly in accordance with the teachings of the present disclosure.
Figure 19:
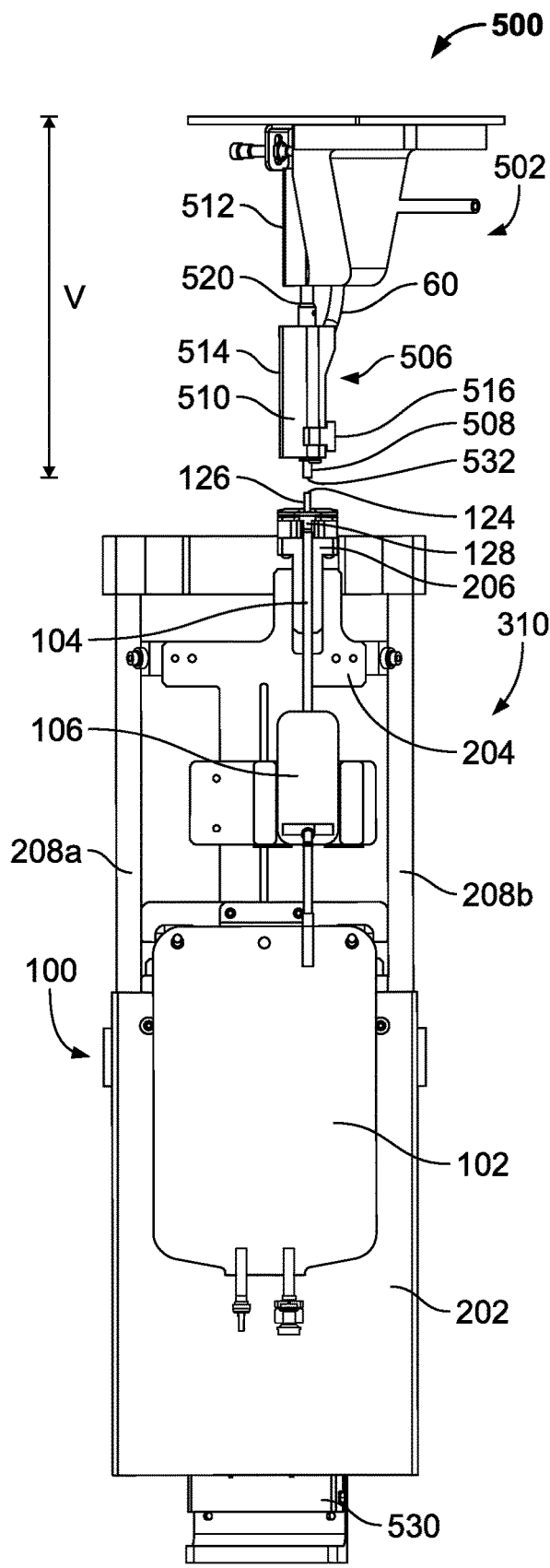
FIG. 19 is a front view of the filling station and the loaded cradle assembly of FIG. 18.

FIGS. 18-19 illustrate the loaded cradle assembly 310 positioned at the filling station 36 adjacent and below a filling station tooling 500. The filling station tooling 500 includes a dispensing apparatus 502 (FIGS. 20A-21) suspended from to the rail 19 of the base frame 18 (FIG. 1), and a sensing and actuating apparatus 504 attached to the core 66 of the carousel assembly 300. In FIGS. 18-19, the dispensing apparatus 502 suspends a nozzle assembly 506 above the loaded cradle 310 such that a nozzle 508 of the fill tube 60 and a fill fitting fixture 510 of the assembly 506 are aligned with the nest 206 and the stem 104 of the product bag 100. The fill tube 60 is fluidly connected to the solution of the mixing bag and draws solution from the mixing bag of the mixing tank 50 to dispense the solution (FIG. 1). The tube 60 passes through a partition separating the solution processing compartment 14 to the product bag assembly compartment 12 (FIG. 1), and is held between a swing clamp head 514 and a rotating swing clamp 516 (FIGS. 18-21) of the fill fitting fixture 510. Illustrated in FIGS. 20A-21, the swing clamp head 514 and swing clamp 516 are shaped to secure a nozzle head 518, which may be a luer fitting, into place.

Figure 21:
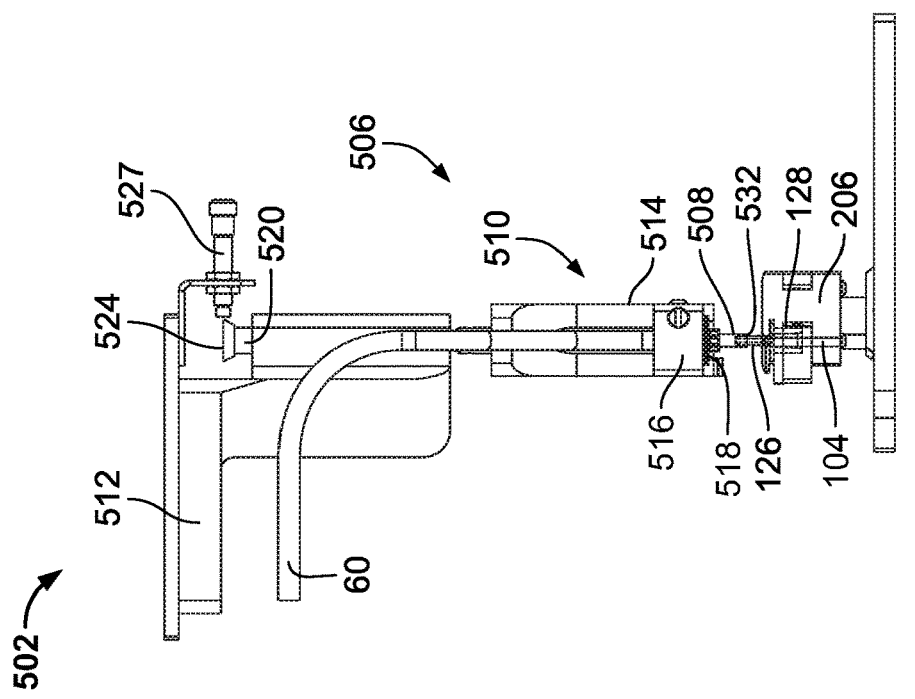
FIG. 21 is a partial side view of the dispensing apparatus of FIG. 18 engaged with a stem of a product bag loaded to a cradle assembly.
Figure 20B:
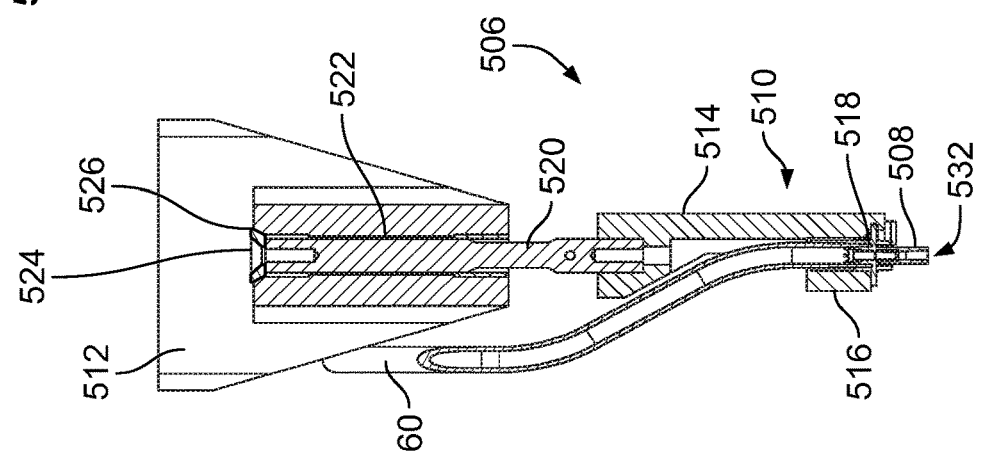
FIG. 20B is cross-sectional view of C-C of FIG. 20A.
Figure 20A:
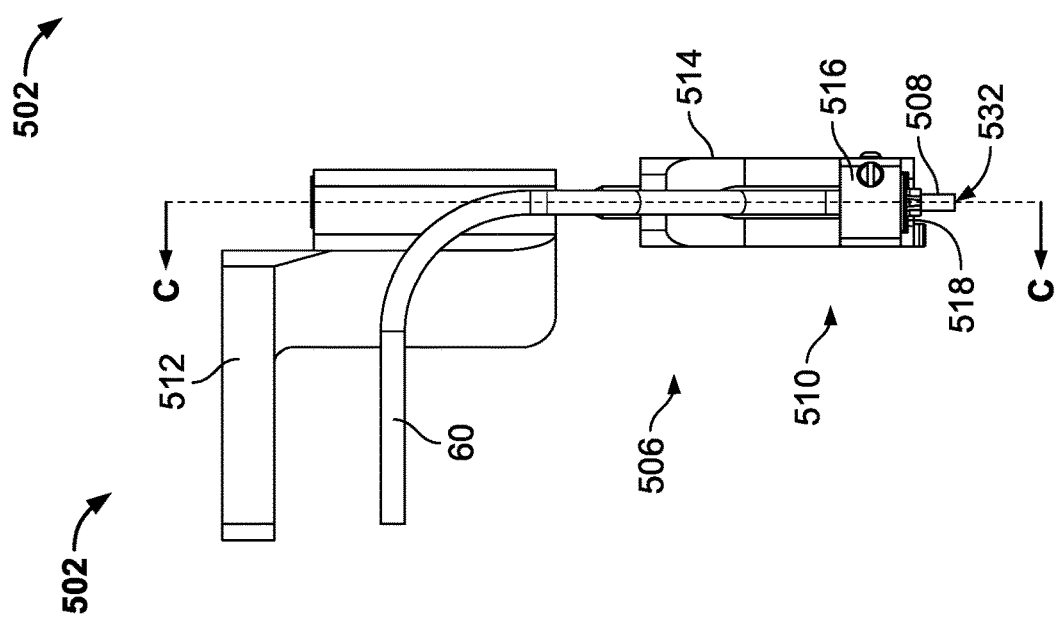
FIG. 20A is a side view of a dispensing apparatus of the filling station of FIG. 18.

Turning now to FIGS. 20A-20B, the fill fitting fixture 510 of the nozzle assembly 506 is attached to the mount head 512 by a sliding rod 520. FIG. 20B illustrates the sliding rod 520 loosely disposed within a bore 522 of the mount head 512 where a capped end 524 of the sliding rod 520 rests on an angled seat 526 of the bore 522. The loose fitting of the rod 520 within the bore 522 allows the fill fitting fixture 510 to float in the vertical direction V relative to the fill head mount 512. The floating arrangement may be seen in the cross-sectional view of FIG. 20B and in FIG. 21. As illustrated in FIG. 21, the fill fitting fixture 510 floats above the stem 104 of product bag 100 such that fill fitting fixture 510 may easily engage the tapered head 126 of the stem 104 without exerting excess force onto the stem 104. The tapered head 126 of stem 104 and the nozzle 508 are engaged, effectively pushing the capped end 524 of sliding rod 520 away from the angled seat 526, and through the bore 522. As seen in FIG. 21, a proximity switch 527, or other motion sensing device, can be located adjacent an opening of the bore 522 and may detect the sealing engagement of the nozzle 508 and the stem 104 as it detects the capped end 24 of the rod 520 being raised relative to the angled seat 526.

Returning back to the loaded cradle 310 of FIG. 18, the sensing and actuating apparatus 504 includes a load cell 528 and an actuator 530 that may be connected to the core 66 of the carousel assembly 300. The sensing and loading apparatus 504 receives the flange 234 and button 232 of the actuating shaft 228 of the cradle 310 as the cradle 310 reaches the filling station 36. The actuator 530 lifts the cradle assembly 310, via the actuating shaft 228, along the guide posts 208a, 208b to sealably connect the stem 104 of the product bag 100 with the nozzle 508 as described above. As the product bag 100 is filled with solution, the load cell 528 senses the weight of the product bag 100 via the actuating shaft 228. Once a predetermined weight of filtered solution is collected in the bladder 102 and has been sensed by the load cell 528, the fill tube 60 stops dispensing the solution from the mixing bag. The cradle 310 is then lowered by the actuator 530 and the outlet 532 of the nozzle assembly 506 and the inlet 124 of the stem 104 disengage. As used herein, the term "sealably connect" or "sealingly engage" refers to a leak-free connection or engaging relationship that is isolated from the environment.

The filling station tooling 500 described herein may be automated or manually controlled. In the preferred example illustrated in FIGS. 18-19, the CPU 64 commands the actuator 530 to lift the loaded cradle 310 to meet the nozzle assembly 506 (FIG. 21). The proximity switch 527 attached to the mount head 512 senses a connection between the nozzle 508 and stem 104 has been made (via movement of the sliding rod 524 through the bore 522 of FIG. 21), and transmits that information to the CPU 64 accordingly. The CPU 64 then turns on or activates the fill pump 56 (FIG. 2) to begin pumping the solution from the mixing tank 50, through the fill tube 60, and to the nozzle assembly 506 to fill the product bag 100. The CPU 64 continuously monitors the load cell 528 (FIG. 18) coupled to the cradle assembly 310 that reads and transmits the weight of the product bag 100 as the bag fills with fluid. Once a predetermined weight is met, the CPU 64 signals to the fill pump 56 to stop pumping the solution through the fill tube 60. The CPU 64 then signals the actuator 530 to lower the cradle assembly 310 to disengage the stem 104 of the product bag 100 from the nozzle 508. Once the actuator 530 returns the cradle assembly 310 to the original position (as illustrated in FIG. 18), the CPU 64 communicates to the servo indexer 76 of the carousel assembly 300 to rotate the carousel 72 to the sealing and cutting station 38.

Station III. Sealing and Cutting Station

Figure 22:
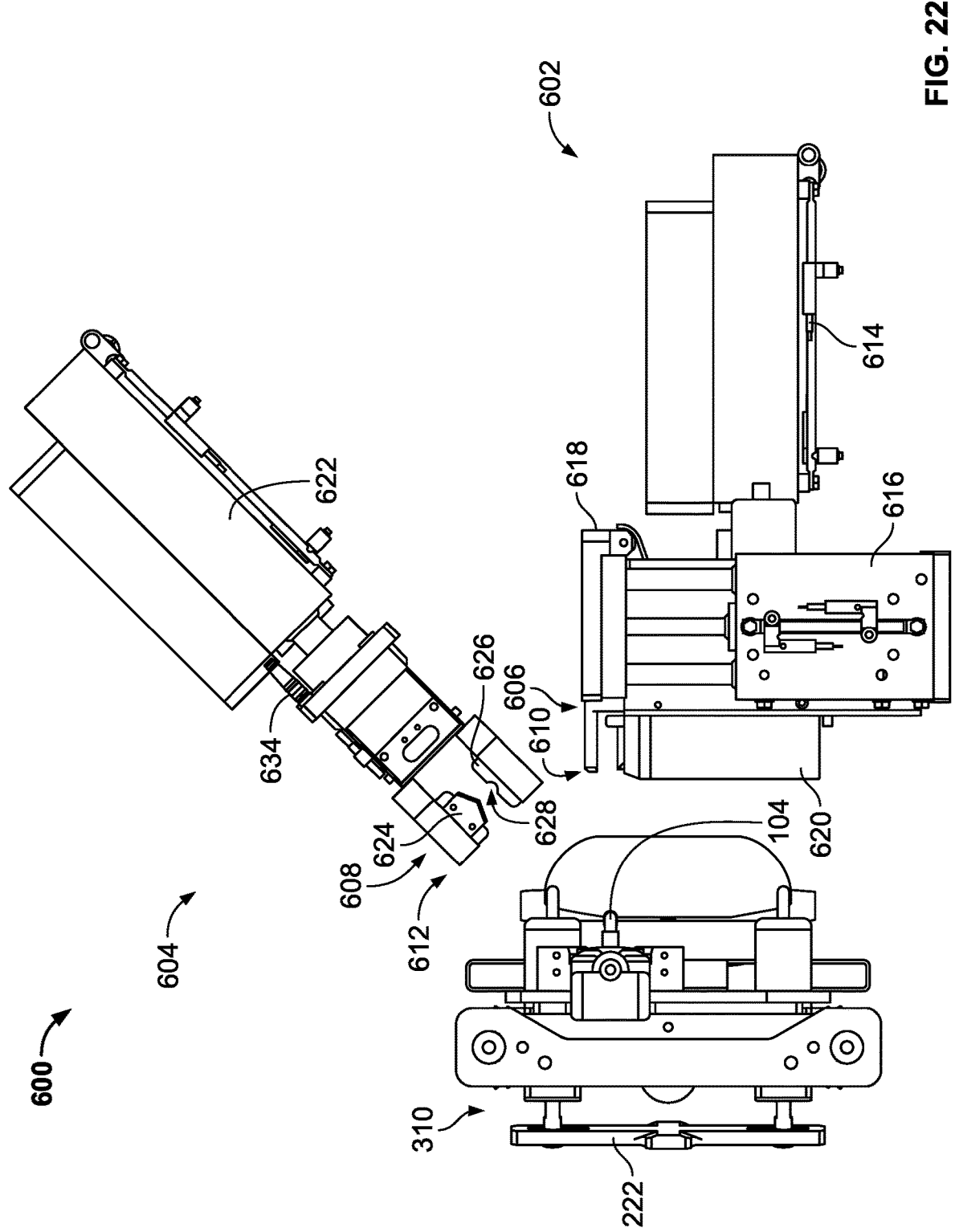
FIG. 22 is a top view of a sealing and cutting station aligned with the loaded cradle assembly in accordance with the teachings of the present disclosure.

FIGS. 22-24C illustrate the loaded cradle assembly 310 and sealing and cutting tooling 600 at the sealing and cutting station 38 (FIGS. 2-3). The sealing and cutting tooling 600 includes a sealing device 602 and a cutting device 604 that are configured to move toward and away from the stem 104 of the filled product bag 100 to seal and cut the stem 104. As illustrated in FIG. 22, a sealer 606 of the sealing device 602 and a cutter 608 of the cutting device 604 are in a retracted position such that the sealer 606 and the cutter 608 are positioned away from the stem 104 of the product bag 100. The sealer 606 and the cutter 608 are also in an open position to receive the stem 104. Turning first to the sealing device 602, the sealer 606 is actuated by first and second actuators 614, 616 that move the sealer 606 toward and away from the stem 104, and open and close the sealer 606 around the stem 104, respectively. The sealer 606 may be a conventional heat seal gun with heated jaws 610 that clamp together, or close, when a trigger 618 of the sealer 606 is engaged. The sealer 606 is attached to a tube seal head 620 such that the stem 104 is positioned in-line with a midpoint between the jaws 610. The first actuator 614 is attached to the tube seal head 620 and is configured to advance the sealer 606 toward and away from the stem 104. The second actuator 616 is configured to engage and disengage the trigger 618 to close and open the jaws 610, respectively.

Similarly, the cutting device includes a first actuator 622 that advances the cutter 608 toward and away from the stem 104. The cutter 608 of the cutting device 604 includes jaws 612 having a blade 624 and a stem guide 626 to cut the stem 104 when the jaws 612 are closed. The stem guide 626 provides a semi-circular aperture 628 to receive the stem 104 as the blade 624 cuts through the stem 104. The midpoint of the jaws 612 of the cutter 608 is aligned with the stem 104.

The sealer 606 and the cutter 608 are positioned so that the jaws of each device engage the sealing and cutting area 132 of the stem 104 (FIGS. 5-8). For example, FIGS. 23A-23B illustrate a side view of the sealer 606 and the cutter 608 and how each aligns with a certain area located on the stem 104. As indicated in FIG. 23B, the jaws 612 of the cutter 608 are configured to cut the stem 104 at an area 630 below the outlet 146 of the filter 106, and the sealer 606 is configured to create a seal on the stem 104 at an area 632 below the cutting area 630 and above the inlet 148 of the duct 134.

Figure 24A:
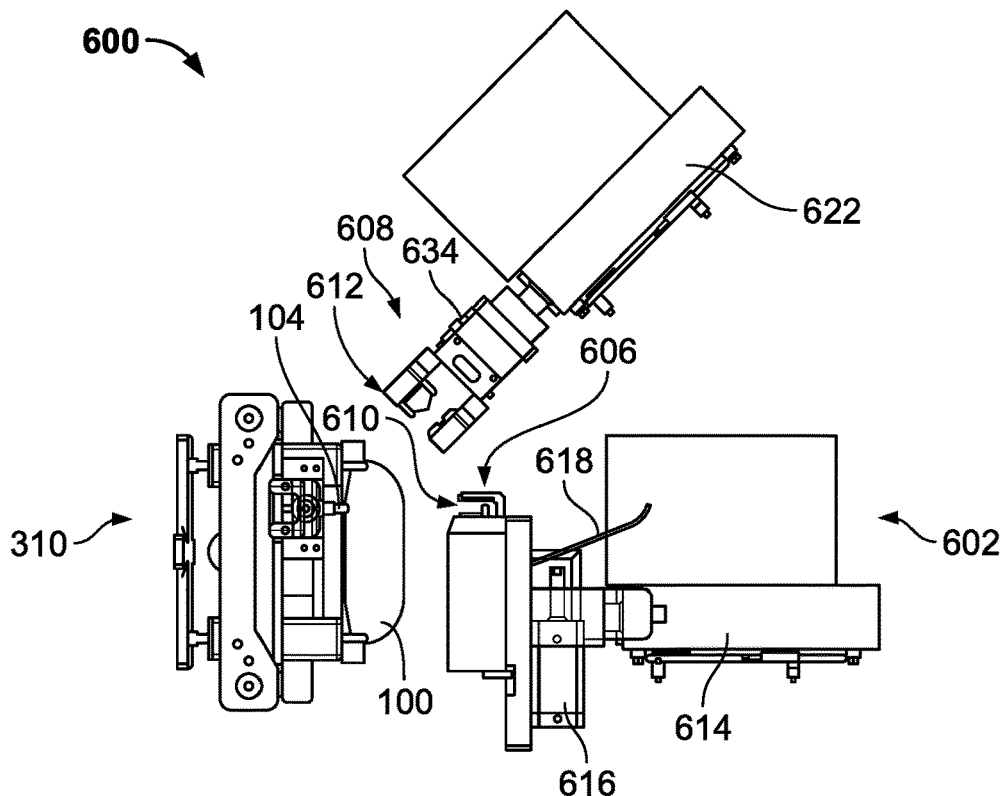
FIG. 24A is a top view of a sealing device and a cutting device in retracted positions at the sealing and cutting station of FIG. 22.
Figure 24B:
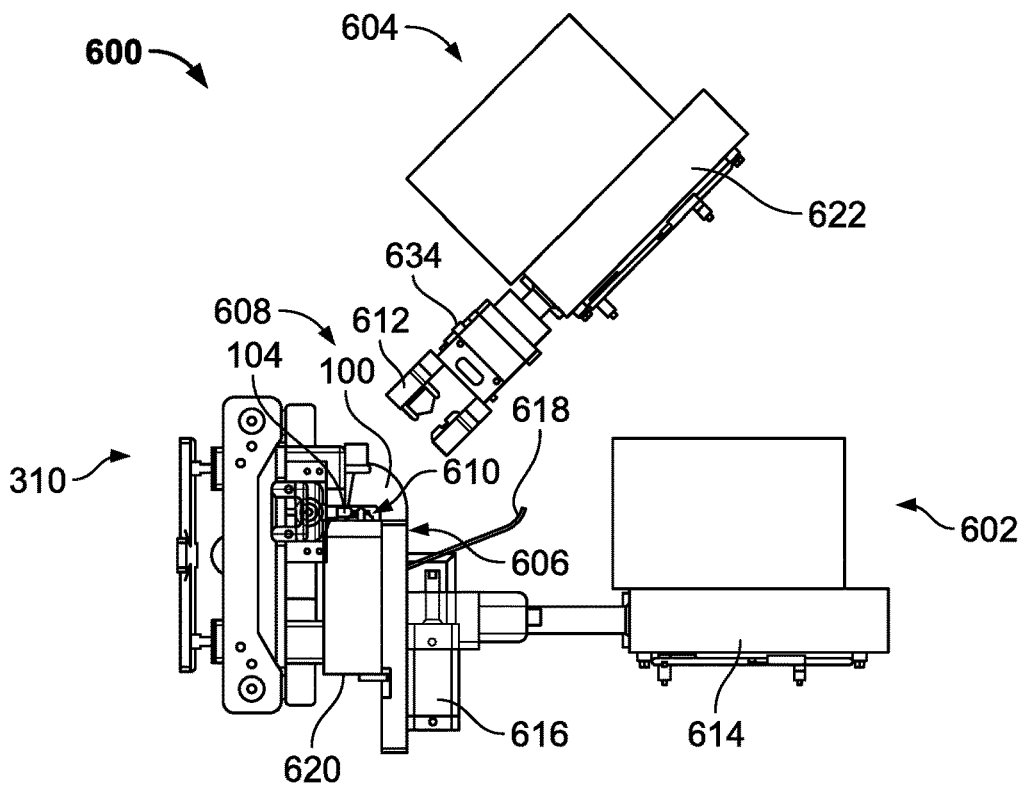
FIG. 24B is a top view of the sealing device in an advanced position and the cutting device in the retracted position.
Figure 24C:
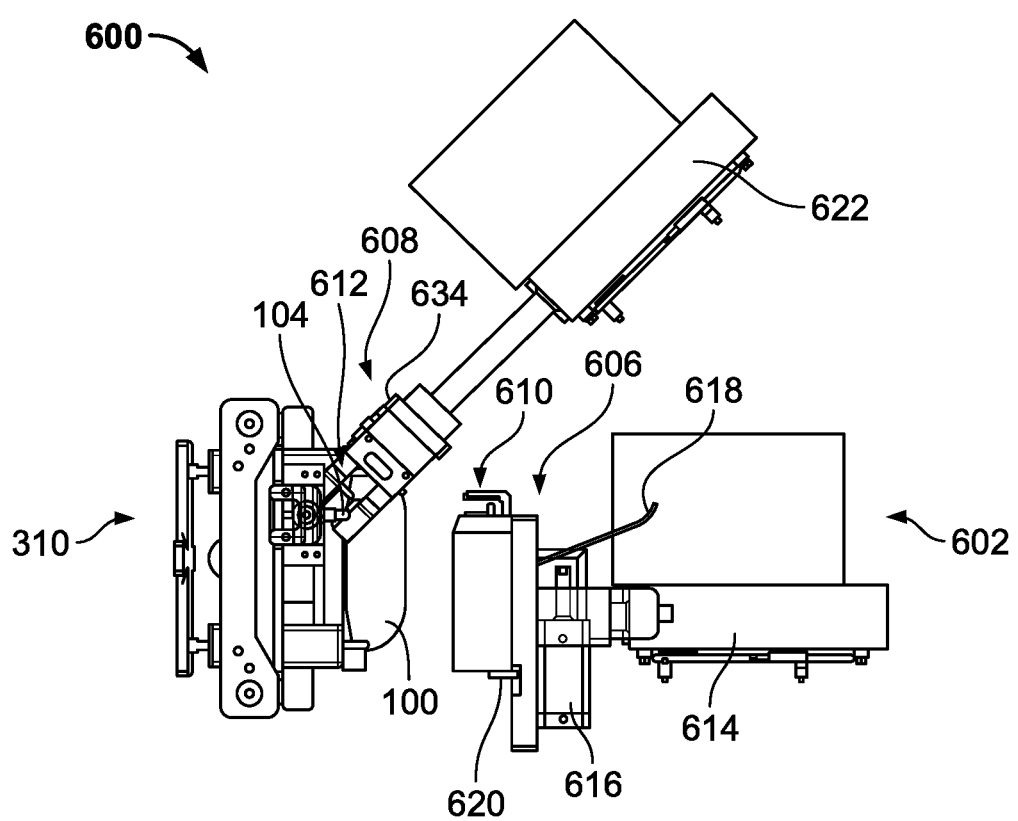
FIG. 24C is a top view of the cutting device in the advanced position and the sealing device in the retracted position

In the preferred example of FIGS. 24A-24C, the CPU 64 activates the sealing and cutting devices 602, 604 at the sealing and cutting station 38. FIG. 24A depicts the sealer 606 and the cutter 608 in both the open position and the retracted position. The CPU 64 sends a command to the first actuator 614, which responds by sliding the tube seal head 620 toward the stem 104, as illustrated in FIG. 24B. A proximity switch (not illustrated) may sense the stem 104 positioned between the jaws 610 of the sealer 606 and transmits a signal relaying the location to the CPU 64. The CPU 64 sends a command to the second actuator 616 to engage the trigger 618 of the sealer 606 to clamp the jaws 610 onto the stem 104. As the jaws 610 clamp onto the stem 104, the seal area 632 of the stem 104 is pressed closed and heated to create a seal (FIG. 24B). After the stem 104 is effectively sealed, the CPU 64 commands the second actuator 616 to release the trigger 618, and commands the first actuator 614 to retract the tube seal head 620 away from the cradle 310. Once the sealer 606 is positioned away from the stem 104, the CPU 64 commands the actuator 622 of the cutting device 604 to move the cutter 608 toward the stem 104. A proximity switch 634 senses the cutter 608 in position around the stem 104 and transmits that information to the CPU 64. In response, the CPU 64 activates the jaws 612 of the cutter 608 to close around the stem 104 to make a single cut, as illustrated in FIG. 24C. The CPU 64 signals to the actuator 622 to return the cutter 608 to the open and retracted position, as illustrated in FIG. 22. Although the stem 104 is cut, the product bag 100 remains attached to the support plate 202 of the cradle 310 via the hang pins 210a, 210b, and the stem 104 and filter 106 remain attached to the back plate 204 via the nest 206 and filter support prongs 218.

Although FIGS. 22-24C illustrate a preferred system and process for sealing and cutting the stem 104 of the product bag 100, the disclosed system is not limited to the tooling 600 depicted in the figures. In other embodiments, the sealing apparatus may be positioned at an angle relative to the cradle assembly 310, and the cutting apparatus may be positioned directly in front of the cradle assembly 310. Alternatively, the sealing and cutting functions may be completely or partially processed by hand. Once the stem 104 of the filled product bag 100 is sealed and separated from the bladder 102, the carousel 72 rotates the cradle 310 to the testing and unloading station 40 (FIGS. 2-3).

The integrity test may be run before the stem 104 is sealed and cut. In an embodiment of the system and machine, the third station 38 may only have a sealing or crimping device. In this case, the stem 104 may be hermetically crimped, rather than sealed, at the third station 38 before moving to the testing and unloading station 40. After the filter integrity test has been performed, the stem 104 may then be sealed and cut as described herein.

To avoid microbial growth, it may be advantageous to seal (or crimp) the stem 104 shortly after the product bag 100 has been filled with fluid. The filter media effectively filters out microbes and bacteria when the product bag 100 is filled at the filling station 36. Therefore, it is possible that the filtered microbes may grow through the pores and the bacteria may release endotoxins, therefore creating a sterility issue, if the stem 104 of the bag is not sealed or hermetically crimped in due time.

Station IV. Testing and Unloading Station

Figure 25:
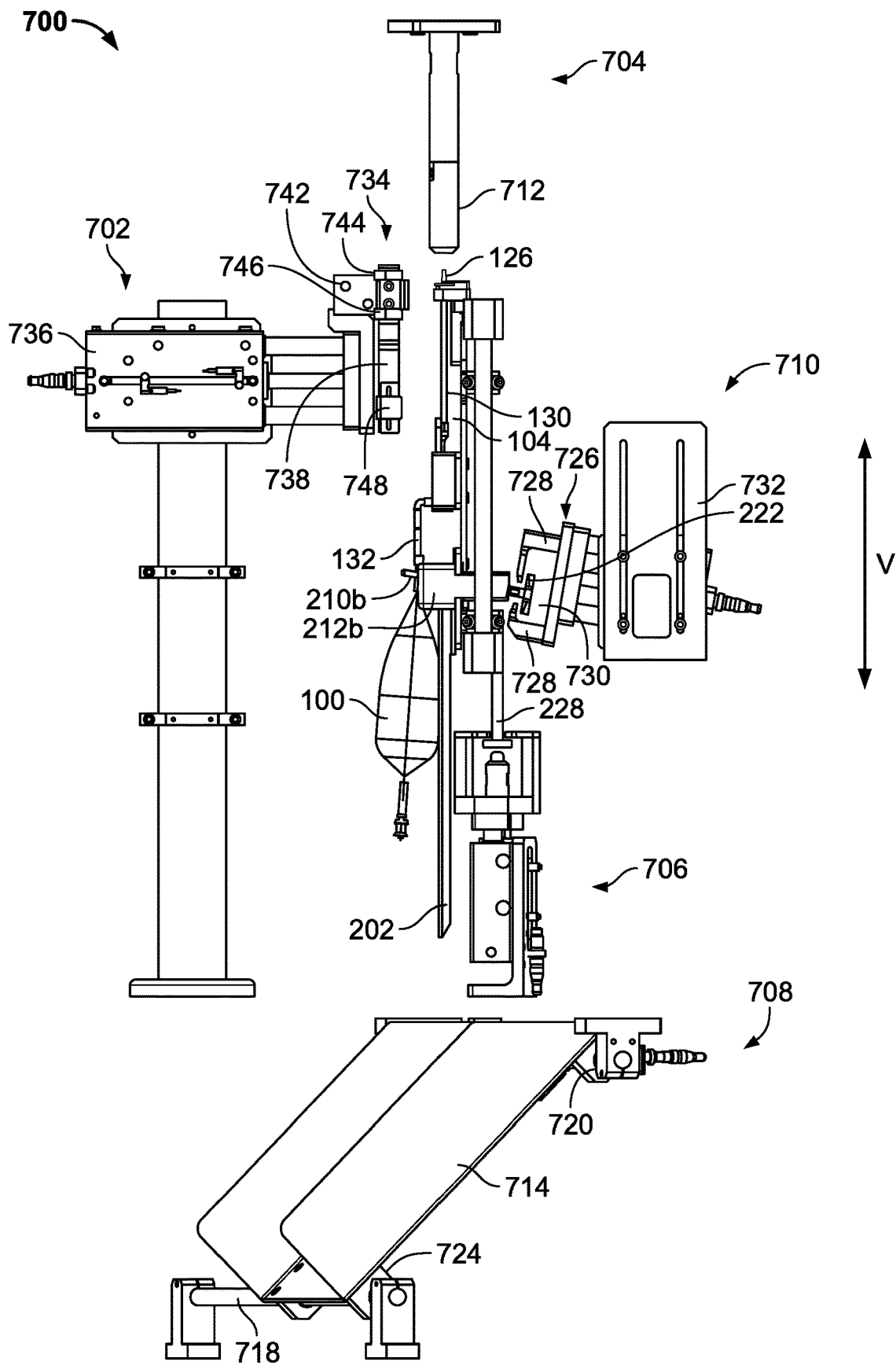
FIG. 25 is a side view of a testing station aligned with a loaded cradle assembly in accordance with the teachings of the present disclosure
Figure 26:
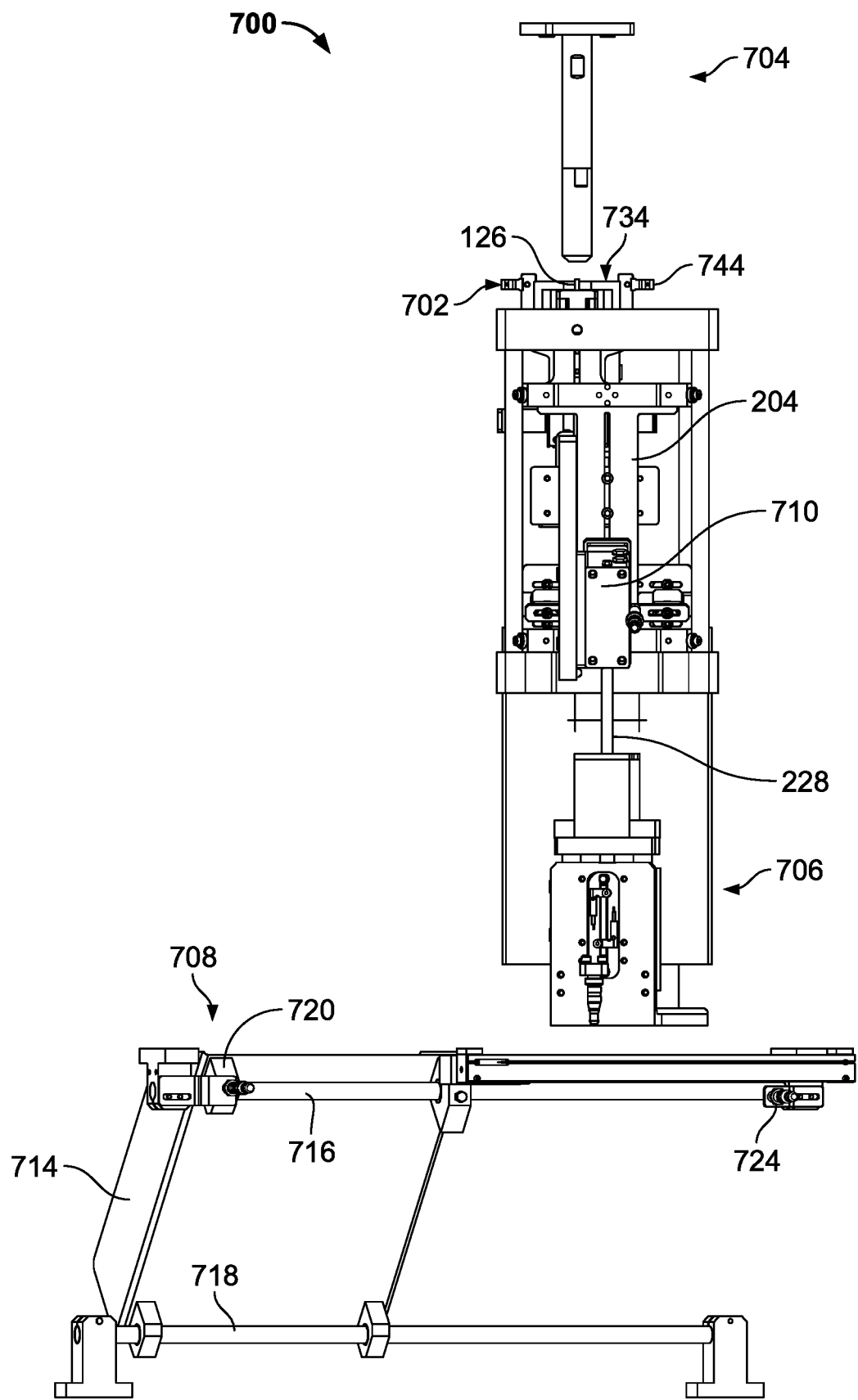
FIG. 26 is a back view of the testing station and loaded cradle assembly of FIG. 25.

FIGS. 25-26 illustrate the tooling 700 of the testing and unloading station 40, which includes a stem-gripping device 702, a filter testing device 704, an actuator 706, a diverter 708, and a pin-pull device 710. The filter testing device 704 is mounted to the rail 19 of the base frame 18 and located above the stem 104. The filter testing device may be pre-programmed or controlled to perform a filter integrity test, such as a bubble test, a pressure degradation test, water intrusion test, a water flow test, or any suitable test known in the art. A pressure degradation test is a method for testing the quality of a filter either before or after the filter has been used. In the preferred embodiment, the filter 106 disposed in-line with the stem 104 of the product bag 100 is tested after the solution passes through the filter 106 and into the bladder 102 of the product bag 100. To perform the integrity test, the actuator 706, which is connected to the core 66 of the carousel assembly 300, lifts the actuating shaft 228 and cradle assembly 310 upwards toward a test head 712 of the filter testing device 704 until the test head 712 engages the tapered head 126 of the stem 104. The filter integrity test determines the presence of any structural flaws in the filter membrane 142 that may prevent the filter 106 from adequately sterilizing a fluid as the fluid passes through the stem 104 and into the bladder 102. For example, a hole having a diameter larger than 0.2 microns ($\mu$m) in the filter membrane 142 may allow particulates in the fluid to pass through the filter 106 and compromise or contaminate the sterile environment of the bladder 102.

To perform the filter integrity test using a pressure degradation test procedure, the test head 712 engages the head 126 of the stem 104 and applies an air pressure of a predetermined value to the inlet 124 and filter membrane 142. In an embodiment the pre-determined value is the pressure where gas cannot permeate the membrane 142 of an acceptable filter. A pressure sensor, or other method of measuring the integrity of the filter, is located within the test head 712 and measures the pressure decay or diffusion rate through the filter membrane 142. The results from the integrity test are assessed to determine the quality of the filter 106, and therefore the quality of the solution of the filled product bag 100. If the pressure sensor measures a decay or a unexpected rate of decay, then the filter 106 fails the test.

Alternatively in a bubble point test, the test head 712 gradually increases the pressure applied to the filter 106, and the increase in pressure is measured in parallel with the diffusion rate of the gas through the media 142. Any disproportionate increase in diffusion rate in relation to the applied pressure may indicate a hole or other structural flaw in the filter membrane 142, and the filter would fail the integrity test Based on the results of the filter integrity test, a determination that the solution of the filled product bag is either sterile or has the potential of being compromised may be made with a high degree of certainty. The filter integrity test performed at the testing station 40 is not limited to those methods described herein, and may include a different acceptable filter test designed to assess the quality and performance of the filter.

As illustrated in FIGS. 25 and 26, the diverter 708 is located below the cradle 310 to receive and distribute the filled product bag 100. The diverter 708 includes a chute 714 positioned at an angle between an upper guide shaft 716 and a lower guide shaft 718. The chute 714 includes upper and lower chute supports 720, 722 that slidably couple to the upper and lower guide shafts 716, 718. An actuator (not shown), such as a pneumatic actuator, moves the chute 714 between a first position and a second position along the guide shafts. In response to a signal indicating a "pass" or a "fail" integrity test result, the actuator is activated to move the chute 714 into the second position or remains in a first position, accordingly. For example, if the filter 106 passes the integrity test, the diverter 708 is activated and the chute 714 occupies the second position to receive an acceptable filled product bag. The chute 714 may direct the acceptable bag to the exit chute 42 or to a bin for storage. On the other hand, if the filter 106 fails the integrity test, the chute 714 remains in the first position (FIGS. 25-26) and receives a rejected product bag and relays the rejected bag to the storage bin compartment 16 for disposal. In the illustrated example of FIG. 1, an accepted filled product bag 100 is located within the exit chute 42. While not illustrated, in other embodiments, the exit chute 42 may direct the acceptable bag 100 to a bin or may keep the product bag 100 on the exit chute 42 until manually removed.

After the diverter 708 either remains in the first position or moves the chute 714 to the second position, the pin-pull device 710 may then remove the filled product bag 100 from the cradle 310. In FIG. 25, the pin-pull device 710 of the testing station 40 is mounted to the tool plate 74 of the carousel assembly 300 and is configured to pull the pull bar 222 to unload the filled product bag 100. The pin-pull device 710 includes an actuated claw 726 with first and second pull fingers 728 coupled to an actuator 732. The claw 726 provides an aperture 730 between the pull fingers 728 that receives the pull bar 222 of the cradle 310 as the cradle 310 moves into position at the testing station 40. FIG. 25 illustrates the pull bar 222 disposed within the aperture 730 of the claw 726. After the diverter 708 positions the chute 714 according to the filter integrity test results, the actuator 732 is signaled to retract the claw 726 away from the cradle 310. As the claw 726 moves, the pull fingers 728 engage the pull bar 222 to pull the hang pins 210a, 210b from the apertures 112 of the product bag 100 and into the support blocks 212a, 212b. As the hang pins 210a, 210b retract, the filled product bag 100 drops from the cradle assembly 200.

Figure 27:
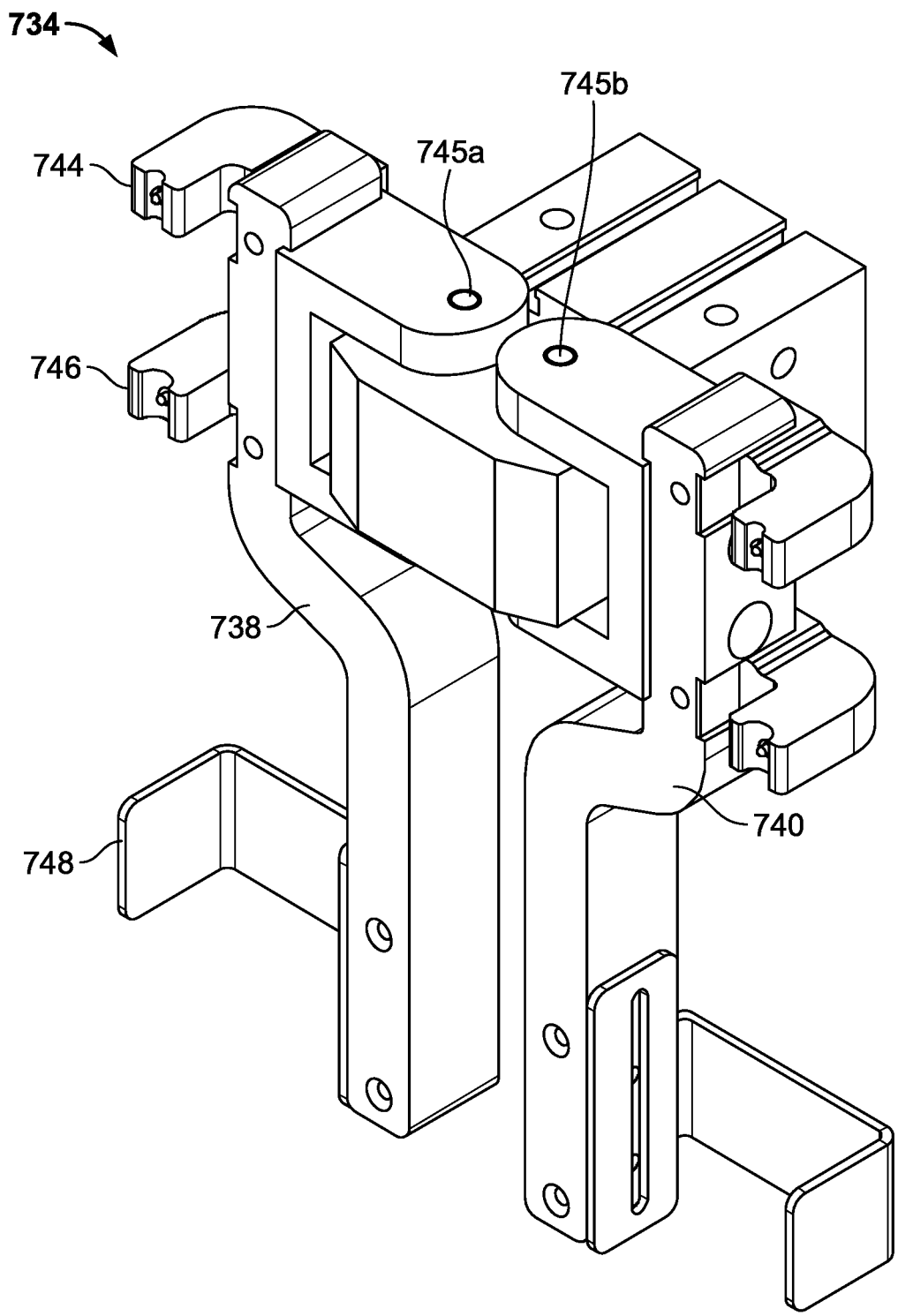
FIG. 27 is a perspective view of a stem grip mechanism of the testing station in an open position.
Figure 28:
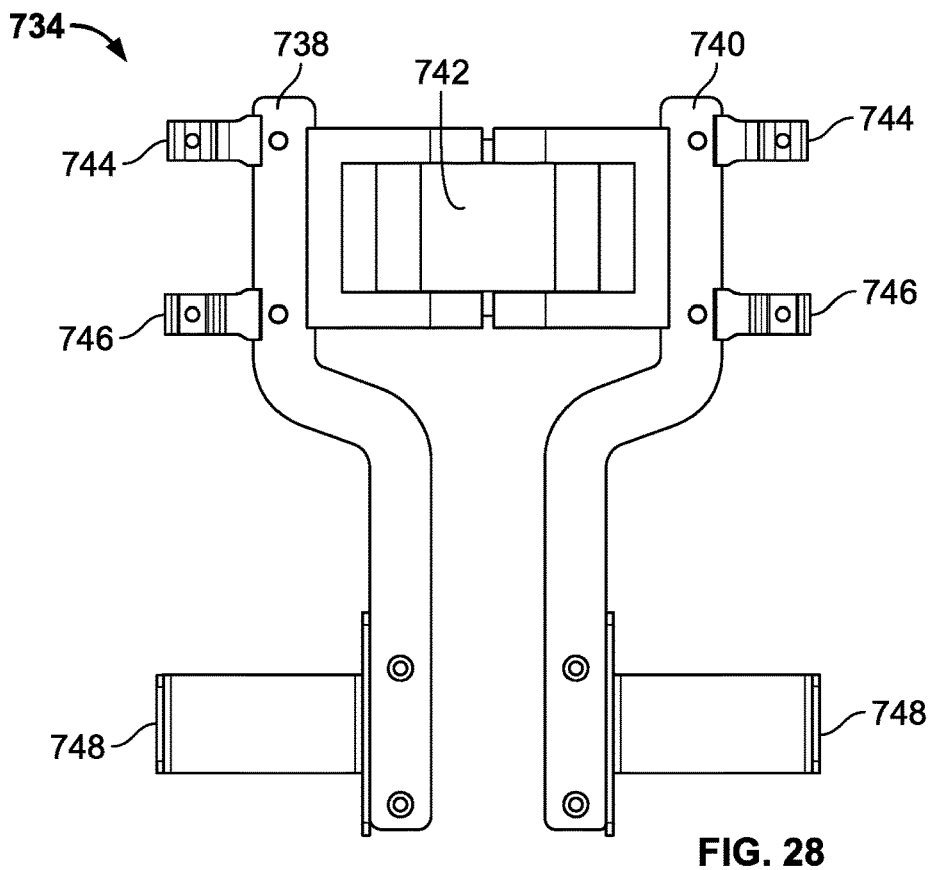
FIG. 28 is a front view of the stem grip mechanism of FIG. 27.
Figure 29:
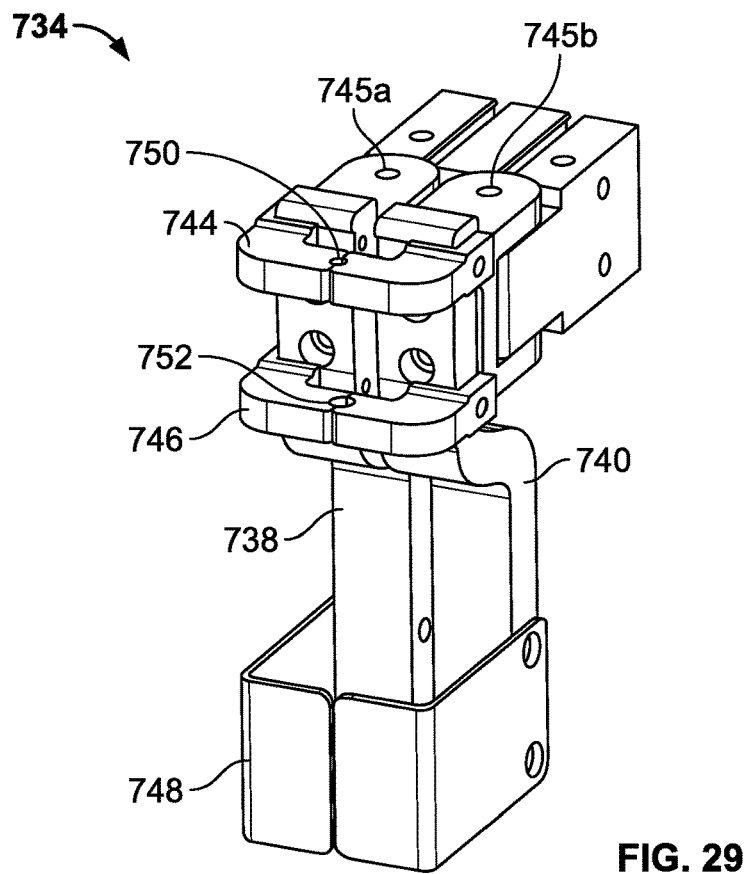
FIG. 29 is a perspective view of the stem grip mechanism of FIG. 27 in a closed position.

Referring back to the FIGS. 25, and 27-29, the stem gripping device 702 is configured to remove the stem 104 from the back plate 204 of the cradle assembly 310 and discard the stem 104 and the filter 106 after testing. The stem gripping device 702 includes a stem grip mechanism 734 coupled to an actuator 736, as depicted in FIG. 25. As best illustrated in FIGS. 27-29, the grip mechanism 734 includes a first and second rotating post 738, 740 attached to a block 742 via first and second pins 745a, 745b. Each post 738, 740 includes an upper gripping finger 744, a middle gripping finger 746, and a lower gripping bracket 748. FIGS. 27-28 illustrated the mechanism 734 in an open position. The gripping fingers 744, 746 and gripping bracket 748 of the first post 738 meet the gripping fingers 744, 746 and gripping bracket 748 of the second post 740 when the first and second posts 738, 740 rotate about their respective pins 745a, 745b to occupy the closed position, as illustrated in FIG. 29. In particular, the mechanism closes when the first post 738 rotates counterclockwise about the first pin 745a, and the second post 740 rotates clockwise about the second pin 745b. In the closed position shown in FIG. 29, the grip mechanism 734 forms a first aperture 750 between closed upper gripping fingers 744, and a wider second aperture 752 between closed middle gripping fingers 746. The apertures 750, 752 correspond to the parts of the stem 104, particularly the tapered head 126 and the first part 130, that are gripped by the grip mechanism 734. Turning back to FIGS. 26-27, the actuator 736 attached to the block 742 is configured to advance the grip mechanism 734 toward and away from the cradle assembly 310.

As depicted in FIG. 25, the grip mechanism 734 is fully extended by the actuator 736 and is positioned adjacent to the stem 104 of the bag 100. To remove the stem from the cradle 310, the rotatable posts 738, 740 rotate to the closed position and the gripping fingers 744, 746 of the posts 738, 740 grip or clamp onto the tapered head 126 and the first part 130 of the stem 104. The stem 104 is removed from the cradle 310 when the actuator 736 retracts the grip mechanism 734, and causes the gripping fingers 744, 746 and brackets 748 to pull the stem 104 and the filter 106 free from the back plate 204 of the cradle 200. Once fully retracted, the grip mechanism 734 opens to release and discard the stem 104 and the filter 106 into the storage compartment 16. After the stem 104, filter 106, and bag 100 are removed from the cradle assembly, the carousel 300 rotates the cradle 200 back to the loading position 32.

In the preferred example illustrated in FIGS. 25-29, the CPU 64 operates the automated process at the testing and unloading station 40. After the carousel 72 rotates the cradle 310 to the testing position 40, the CPU 64 sends a command to the actuator 706 to lift the actuating shaft 228 of the cradle 310 so that the tapered head 126 of the stem 104 meets the test head 712 of the testing device 704. Once the test head 712 engages the stem 104, the CPU 64 signals a Integrity Tester (not illustrated) to perform the filter integrity test via the test head 712 and monitor the pressure sensor. The Integrity Tester processes the results from the pressure sensor to determine whether the filter 106 passes or fails the integrity test, and sends the results (either a pass or a fail) to the CPU 64. If the filter 106 passes the result, the CPU 64 commands the actuator of the diverter 708 to move the chute 714 into the second position. The proximity switch attached to the diverter 708 senses that the chute 714 is in position, and transmits the information to the CPU 64. The CPU 64 then commands the actuator 732 of the pin-pull device 710 to move the claw 726 to engage the pull bar 222 and release the bag 100. The diverter 708 may sense the bag drop into the chute 714, and may transmit that information to the CPU 64. If the chute 714 is in the second position, the CPU 64 signals to the diverter 708 to retract the chute 714 to occupy the first position. The CPU 64 may then activate the actuator 736 to advance the stem grip mechanism 734 toward the stem 104 and to close the rotating posts 738, 740 around the stem 104. Once the stem 104 is gripped by the gripping fingers 744, 746 of the stem grip mechanism 734, the CPU 64 sends a signal to the actuator 736 to retract and open the grip mechanism 734 to discard the stem 104 and the filter 106.

According to a preferred method of providing filled product bags of sterile fluid, the method may include securing a product bag 100 to one of a plurality of movable cradles 200. After securing the product bag 100 to a movable cradle 200, an inlet 124 of the stem 104 may be connected to an outlet 532 of a nozzle assembly 506, at least partially filling the product bag 100 with a fluid through a nozzle 508 of the nozzle assembly 506 to create a filled product bag 100, wherein filling the product bag 100 includes passing the fluid through the filter 106 and into the bladder 102. After filling, the method includes creating a seal on the stem 104 of the filled product bag 100 at a location 632 below the filter 106, cutting the stem 104 at a location 630 above the seal and below the filter 106. Once the stem 104 is cut and the bag 100 sealed, the method proceeds in performing an integrity test on the filter 106, removing the filled product bag 100 from the cradle 200, and depositing the filled product bag 100 into a first bin for rejected bags if the filter fails the integrity test and a second bin for accepted bags if filter passes the integrity test.

The method and machine disclosed herein provide considerable benefits over current methods of terminal sterilization. The machine is portable and self-containing, allowing remote health facilities and clinics to process a supply of sterile product bags without incurring the costs of outsourcing from a third party. Additionally, the process and method described herein provide sterile solution bags without using a sterilizing autoclave and/or expensive sterilization equipment required to sterilize the working environment and eliminates the risk of formulation degradation due to heat exposure. The self-contained and automated machine reduces the sterilization procedures necessary to be performed in terminal sterilization processes.

The method and machine disclosed herein reduces risk of contamination. The product bag having a filter disposed in-line with a stem avoids exposing the post-filtered sterile fluid to the working environment. Rather, the sterile filtered solution is never exposed to environment thereby producing a fluid that has been subject to terminal sterilization filtration. Moreover, in the case a filled product bag were determined to be compromised, the compromised bag would be contained and discarded without contaminating the processing equipment of the machine or other product bags being processed.

Further, the machine and processing system allow for a one-to-one processing and testing correlation such that the quality of the solution in the product bag is ensured without puncturing or destroying the filled bag.

What is claimed is:

1. A method of providing a plurality of filled product bags of sterile fluid, the method comprising:
   providing a plurality of product bags, wherein each product bag has a bladder, a stem fluidly connected to an opening of the bladder, and a filter disposed in-line with the stem; and
   creating a plurality of filled product bags by performing the following on each product bag:
   at least partially filling the product bag with a fluid to create a filled product bag, wherein filling the product bag includes passing the fluid through the filter and into the bladder;
   after filling, sealing the stem of the filled product bag at a location downstream from the filter to create a seal;
   performing an integrity test on the filter;
   correlating an integrity of the contents of the filled product bag to an integrity of the filter based on an outcome of the integrity test; and
   after sealing the stem, cutting the stem between the filter and at least a portion of the seal to separate the stem from a sealed and filled product bag;
   wherein providing a plurality of product bags includes providing at least one of the plurality of product bags with multiple bladders connected to the stem.

2. The method of claim 1, further including connecting an inlet of the stem to an outlet of a nozzle.

3. The method of claim 2, wherein at least partially filling the product bag includes drawing the fluid from a mixing container through a fill tube, and dispensing the fluid from the fill tube through the outlet of the nozzle.

4. The method of claim 3, further including passing the fluid through a filter prior to dispensing the fluid through the nozzle.

5. The method of claim 2, wherein connecting the inlet of the stem to the nozzle includes engaging a luer fitting of the nozzle to the inlet of the stem.

6. The method of claim 2, further comprising removing a sterile closure cap covering the inlet of the stem before connecting the inlet to the nozzle.

7. The method of claim 1, further including securing a product bag to one of a plurality of movable cradles and rotating a carousel about a central axis, the carousel carrying the plurality of movable cradles evenly disposed on a perimeter of the carousel, wherein rotating the carousel moves each of the plurality of cradles between two positions of a plurality of positions.

8. The method of claim 7, wherein connecting the inlet of the stem to the nozzle includes moving the cradle.

9. The method of claim 7, further including removing the filled product bag from the cradle.

10. The method of claim 1, further including measuring an amount of fluid in the bladder of the filled product bag with a load cell, and discontinuing filling the product bag when the product bag contains a predetermined amount of fluid.

11. The method of claim 10, wherein discontinuing filling includes removing the inlet of the stem from the nozzle.

12. The method of claim 10, further including disconnecting the inlet of the stem from the nozzle when the product bag is filled to the predetermined amount.

13. The method of claim 1, wherein performing the integrity test includes performing at least one of a bubble test and a pressure degradation test.

14. The method of claim 1, wherein performing the integrity test includes sensing a pressure applied to the filter with a pressure sensor.

15. The method of claim 1, further including depositing the filled product bag into a first bin for rejected bags if the filter fails the integrity test and a second bin for accepted bags if filter passes the integrity test.

16. The method of claim 15, further including moving a diverter directed to one of the first bin or the second bin based on the results of the filter integrity test.

17. The method of claim 1, wherein performing the filter integrity test includes assessing the filter for structural flaws.

18. The method of claim 1, wherein passing the fluid through the filter includes passing the fluid through a sterilizing grade filter.

19. The method of claim 1, wherein passing the fluid through the filter includes passing the fluid through a 0.2 micron filter.

20. The method of claim 1, further including mixing the fluid in a mixing container prior to at least partially filling the product bag.

21. The method of claim 1, wherein cutting the stem includes cutting the stem at a location above the at least a portion of the seal and below the filter.

22. The method of claim 1, wherein performing the integrity test includes engaging a pressure test head to an open end of the stem.

23. A method of providing a plurality of filled product bags of sterile fluid, the method comprising:
providing a plurality of product bags, wherein each product bag has a bladder, a stem fluidly connected to an opening of the bladder, and a filter disposed in-line with the stem; and
creating a plurality of filled product bags by performing the following on each product bag:
at least partially filling the product bag with a fluid to create a filled product bag, wherein filling the product bag includes passing the fluid through the filter and into the bladder;
after filling, sealing the stem of the filled product bag at a location downstream from the filter to create a seal;
performing an integrity test on the filter;
correlating an integrity of the contents of the filled product bag to an integrity of the filter based on an outcome of the integrity test; and
after sealing the stem, cutting the stem below the filter and above the seal to separate the stem from a sealed and filled product bag;
wherein providing a plurality of product bags includes providing at least one of the plurality of product bags with multiple bladders connected to the stem.

* * * * *